United States Patent
Touboul et al.

(10) Patent No.: US 9,843,974 B1
(45) Date of Patent: Dec. 12, 2017

(54) COMMUNICATION BEAM SOFT HANDOVER

(71) Applicant: QUALCOMM INCORPORATED, San Diego, CA (US)

(72) Inventors: Assaf Touboul, Netanya (IL); Ran Berliner, Kfar-Aviv (IL); Ronen Greenberger, Modiin (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/661,743

(22) Filed: Jul. 27, 2017

Related U.S. Application Data

(60) Provisional application No. 62/407,719, filed on Oct. 13, 2016.

(51) Int. Cl.

| | |
|---|---|
| H04W 36/00 | (2009.01) |
| H04W 36/18 | (2009.01) |
| H04W 36/06 | (2009.01) |
| H04W 36/02 | (2009.01) |
| H04W 36/30 | (2009.01) |

(52) U.S. Cl.
CPC ....... *H04W 36/18* (2013.01); *H04W 36/0094* (2013.01); *H04W 36/026* (2013.01); *H04W 36/06* (2013.01); *H04W 36/30* (2013.01)

(58) Field of Classification Search
CPC ..... H04W 16/28; H04W 36/30; H04W 88/08; H04W 24/10; H04W 40/06; H04W 72/046

USPC .......................... 455/436–444; 370/321–334
See application file for complete search history.

(56) References Cited

U.S. PATENT DOCUMENTS

| 7,062,296 B2 * | 6/2006 | Brennan ................. H04B 7/04 455/561 |
| 8,644,771 B1 * | 2/2014 | Delker .................. H04W 52/48 370/318 |
| 2017/0238216 A1 * | 8/2017 | Damnjanovic ... H04W 36/0072 |

\* cited by examiner

*Primary Examiner* — Ronald Eisner
(74) *Attorney, Agent, or Firm* — Smith Tempel Blaha LLC

(57) ABSTRACT

A method for communication beam transition in a communication system includes exchanging information between a first communication device and a second communication device on a first communication beam, receiving beam information from the second communication device on the first communication beam, sending from the first communication device a beam switch command on the first communication beam, the beam switch command requesting a transition from the first communication beam to a second communication beam, simultaneously sending information from the first communication device to the second communication device on the first communication beam and the second communication beam, and ceasing sending information from the first communication device to the second communication device on the first communication beam when transition to the second communication beam is completed by the first communication device and the second communication device.

28 Claims, 15 Drawing Sheets

COMMUNICATION BEAM SOFT HANDOVER

RELATED APPLICATIONS

This application claims the benefit of U.S. Provisional Patent Application No. 62/407,719, entitled "Communication Beam Soft Handover," filed Oct. 13, 2016, the contents of which are hereby incorporated by reference in their entirety.

TECHNICAL FIELD

The technology discussed below relates to wireless communication systems, and more particularly to communication beam handover in wireless communications. Embodiments enable and provide the ability for a base station and a user equipment (UE) to transition from one communication beam to another and maintain a robust communication channel.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, each otherwise known as user equipment (UE). A base station may communicate with one or more UEs on downlink channels (e.g., for transmissions from a base station to a UE) and uplink channels (e.g., for transmissions from a UE to a base station). UEs may locate a base station by detecting synchronization signal(s), from which the UEs acquire the base station identification code (cell ID), system timing information, frame alignment information, transmission and reception frequency information, etc. In systems where the receiver is highly signal strength and noise limited (e.g., millimeter wave systems), beamformed synchronization signals may be swept across the cell coverage area to provide coverage enhancement to improve detection.

To provide adequate power in a millimeter wave system, multiple directional beams may be swept across the cell coverage area so that adequate power may be transmitted to a UE and so that adequate power may be received from a UE. The multiple beams are directional such that they are each separated by a few degrees. As the UE moves relative to the base station, the quality of the communication channel may improve or degrade. When the quality of the communication channel on a particular beam (for example, a current beam may be referred to as a "serving beam") degrades, it may be desirable for the base station and the UE to communicate over a different beam (for example, a different beam may be referred to as a "target beam"), depending on the signal strength of the current beam and the signal strength of another available beam. Switching from one beam to another may be referred to as "handover" where the base station and the UE agree on which beam to switch to and when to switch from one beam to another.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication beam transition in a communication system. Method embodiments can include exchanging information between a first communication device and a second communication device on a first communication beam, receiving beam information from the second communication device on the first communication beam, sending from the first communication device a beam switch command on the first communication beam, the beam switch command requesting a transition from the first communication beam to a second communication beam, simultaneously sending information from the first communication device to the second communication device on the first communication beam and the second communication beam, and ceasing sending information from the first communication device to the second communication device on the first communication beam when transition to the second communication beam is completed by the first communication device and the second communication device.

Another aspect of the disclosure provides an apparatus for communication beam transition in a communication system including a first communication device and a second communication device configured to exchange information on a first communication beam, the second communication device configured to send beam information to the first communication device on the first communication beam, the first communication device configured to send a beam switch command on the first communication beam, the beam switch command requesting a transition from the first communication beam to a second communication beam, the first communication device configured to simultaneously send information to the second communication device on the first communication beam and the second communication beam, and the first communication device configured to cease sending information to the second communication device on the first communication beam when transition to the second communication beam is completed by the first communication device and the second communication device.

Another aspect of the disclosure provides a device including means for exchanging information between a first communication device and a second communication device on a first communication beam, means for receiving beam information from the second communication device on the first communication beam, means for sending from the first communication device a beam switch command on the first communication beam, the beam switch command requesting a transition from the first communication beam to a second communication beam, means for simultaneously sending information from the first communication device to the second communication device on the first communication beam and the second communication beam, and means for ceasing sending information from the first communication device to the second communication device on the first communication beam when transition to the second communication beam is completed by the first communication device and the second communication device.

Another aspect of the disclosure provides a non-transitory computer-readable medium storing computer executable code for communication beam transition in a communication system, the code executable by a processor to exchange information between a first communication device and a second communication device on a first communication beam, receive beam information from the second communication device on the first communication beam, send from the first communication device a beam switch command on the first communication beam, the beam switch command requesting a transition from the first communication beam to a second communication beam, simultaneously send information from the first communication device to the second communication device on the first communication beam and the second communication beam, and cease sending information from the first communication device to the second communication device on the first communication beam when transition to the second communication beam is completed by the first communication device and the second communication device.

Another aspect of the disclosure provides a method for communication beam transition in a communication system including exchanging information between a first communication device and a second communication device over a first communication beam, and the first communication device and the second communication device transitioning from the first communication beam to a second communication beam when the second communication device acknowledges a beam switch command sent by the first communication device, the beam switch command sent simultaneously on the first communication beam and the second communication beam.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to ensuring that a base station and a UE transition from one communication beam to another communication beam in a manner that minimizes the likelihood of a communication link failure, and that ensures that both the base station and the UE smoothly and accurately transition to the same communication beam and elements thereof, for example, a base station and a UE transitioning from a serving beam to a target beam.

Figure 1:
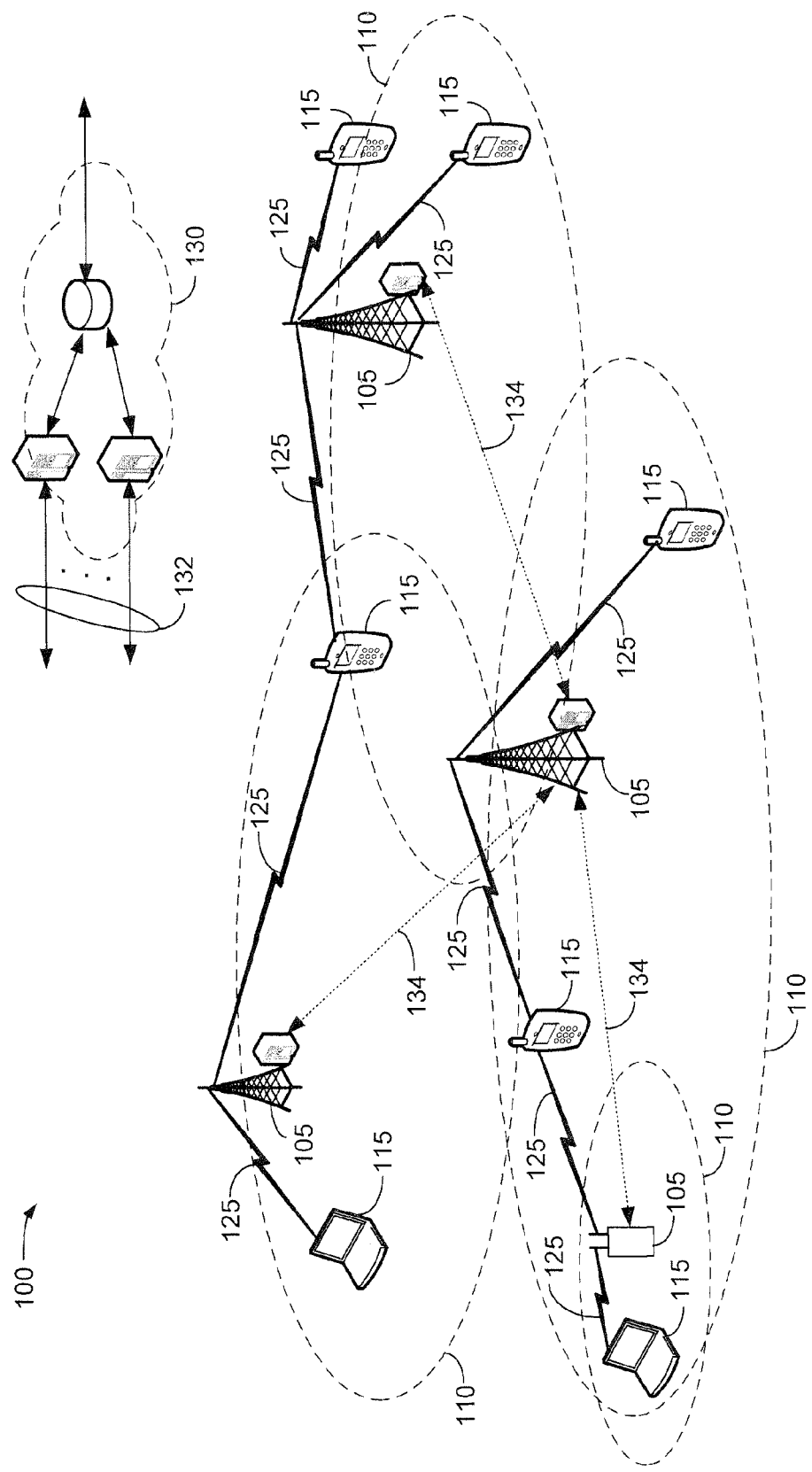
FIG. 1 is a diagram showing a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through a first set of backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over a second set of backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. In a 5G or New Radio (NR) network, a base station may be referred to as a gNodeB (gNB) or a millimeter wave base station (mWB). The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 may be one or more of an LTE/LTE-A network and a 5G network. In LTE/LTE-A networks, the term evolved Node B (eNB) or in a 5G network, the term millimeter wave base station (mWB), or gNB, may be generally used to describe the base stations 105, while the term UE may be generally used to describe the UEs 115. The wireless communications system 100 may be a Heterogeneous LTE/LTE-A and 5G network in which different types of eNBs, gNBs, and/or mWBs provide coverage for various geographical regions. For example, each eNB, gNB, mWB, or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context. In some examples, the wireless communications system 100 may be, or may include a millimeter wave communication network.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, mWBs, gNBs, relay base stations, and the like. A UE 115 may also be able to communicate with other UEs either within or outside the same coverage area of a base station via D2D communications.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bi-directional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support directional synchronization signals for millimeter wave detection and synchronization. For example, a millimeter wave base station 105 may transmit a directional synchronization signal in a sweeping pattern to UEs 115 within its coverage area 110. The base station 105 may configure a narrowband signal of the synchronization signal to convey correlation information, such as location information (e.g., based on cell ID information included or conveyed in the narrowband signal), for a wideband signal of the synchronization signal. Hereinafter, information regarding the properties of the wideband signal may be referred to as correlation information. The base station 105 may link the wideband signal to the location of the narrowband signal. In some examples, the identification information of the base station 105 may be included or conveyed in the narrowband signal. The identification information may convey the location information, e.g., the UE 115 may perform a function based on the base station 105 identification number and/or access a lookup table. The base station 105 may send the wideband signal component of the synchronization signal according to the correlation information in the narrowband signal.

A UE 115 may receive the narrowband signal of the synchronization signal for the millimeter wave communication network and determine the correlation information associated with the wideband signal from the narrowband signal. For example, the UE 115 may identify the base station 105 sending the narrowband signal, may determine the base station 105 identity based on the frequency of the narrowband signal, etc., to determine the correlation information. The UE 115 may use the correlation information to identify and receive the wideband signal. In some examples, the UE 115 may determine timing information based on the narrowband signal and/or the wideband signal components of the synchronization signal, e.g., system timing, frame boundary/length timing, etc.

In an exemplary embodiment, a UE 115 may be operatively coupled to a base station 105 using a millimeter wave communication link that may use multiple beams. The multiple beams may be directional such that they are separated by a few degrees.

As the UE 115 moves relative to the base station 105, the quality of the communication channel may improve or degrade. When the quality of the communication channel on a particular beam degrades, it is desirable for the base station 105 and the UE 115 to communicate over a different beam, depending on the signal strength of the current beam and the signal strength of another available beam. In general, the beam over which the base station 105 and the UE 115 are currently communicating is referred to as the "serving" beam and the beam that may provide a better communication link may be referred to as the "target" beam. Once the handover from the serving beam to the target beam is successfully completed, the "target" beam becomes the "serving" beam.

There are a number of general situations where coordinating the beam handover from the serving beam to the target beam may be compromised. In a first situation, after receiving beam information, such as a beam index (BI) report, from a UE informing the base station of the availability of a target beam that may offer a more robust radio link than the serving beam, the base station 105 may send a communication to the UE 115 informing the UE 115 of the desired target beam, in response to which the UE 115 sends an acknowledgement (ACK) to the base station 105. However, if the ACK is not received and accurately decoded by the base station 105, then the UE 115 may switch to the target beam while the base station 105, which is unaware that the UE 115 acknowledged the beam switch command, stays on the serving beam, resulting in a radio link failure (RLF) between the base station 105 and the UE 115.

In a second situation, after receiving the beam information report from a UE 115 informing the base station 105 of the availability of a target beam that may offer a more robust radio link than the serving beam, the base station 105 may send a communication to the UE 115 informing the UE 115 of the desired target beam, the UE 115 may fail to decode the communication and the UE 115 sends a non-acknowledgement (NACK) to the base station 105. However, the base station 105 may receive this NACK and interpret it as an ACK, whereby the base station 105 believes that the UE 115 acknowledged the beam switch command, does not retransmit the beam switch command, and switches its transmission to the target beam. However, because the UE 115 failed to decode the beam switch command, the UE 115 remains on the serving beam resulting in a radio link failure (RLF) between the base station 105 and the UE 115.

In certain situations, such as those described above, or other situations, the communication beam handover process may fail and the UE 115 and base station 105 may be on different communication beams, thus compromising the communication link. In such situations, it may be desirable for the base station 105 to transmit on both the serving beam and on a target beam simultaneously and allow the UE 115 to confirm which beam it is on. The base station 105 would transmit on the target beam and the serving beam, simultaneously sequentially, or a combination thereof, to ensure that both the base station 105 and the UE 115 transition to the same target beam.

Figure 2:
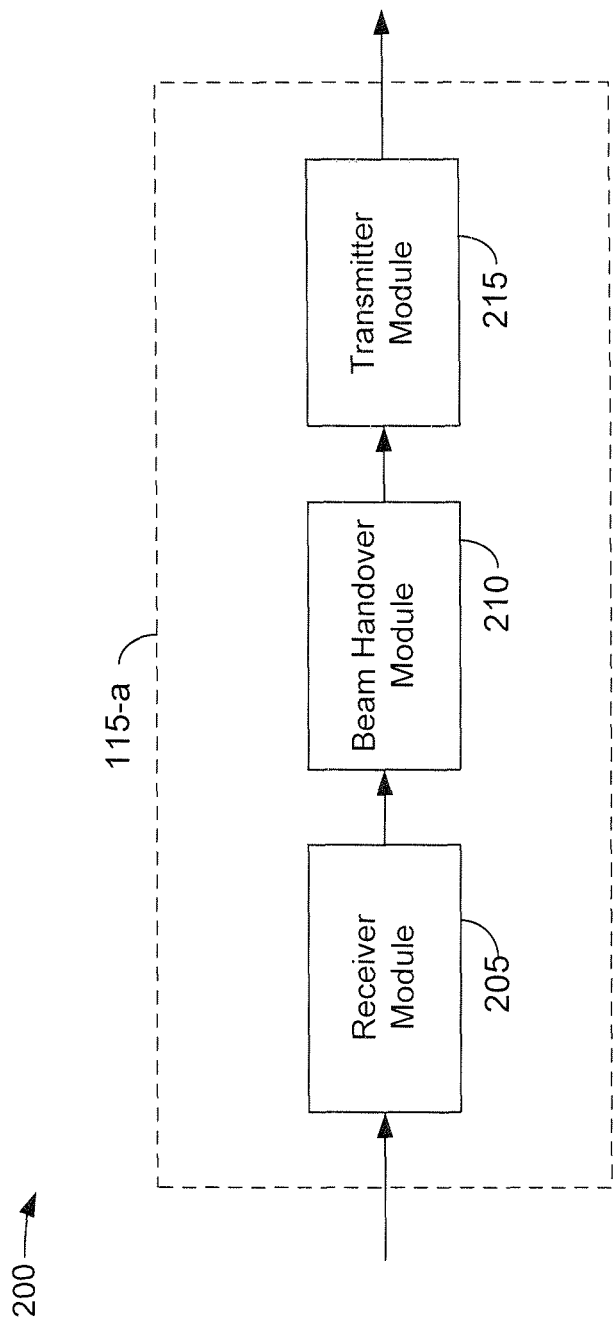
FIG. 2 is a block diagram showing a device configured for use in wireless communication, in accordance with various aspects of the present disclosure.

FIG. 2 is a block diagram 200 of a device 115-a for use in wireless communication, in accordance with various aspects of the present disclosure. The device 115-a may be an example of one or more aspects of a UE 115 described with reference to FIG. 1. The device 115-a may include a receiver module 205, a beam handover module 210, and/or a transmitter module 215. The device 115-a may also be or include a processor (not shown). Each of these modules may be in communication with each other.

The components of the device 115-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 205 may receive information such as packets, user data, and/or control information associated with various information channels (e.g., control channels, data channels, etc.). The receiver module 205 may receive messages from a millimeter wave base station 105 including information associated with synchronization signaling and communication beam selection. Information may be passed on to the beam handover module 210, and to other components of the device 115-a.

The beam handover module 210 may manage communication beam transitions for the device 115-a. The beam handover module 210 may receive, via the receiver module 205, information relating to a number of communication beams, and may generate beam information, such as, for example, a beam index (BI) report, which may be sent to the transmitter module 215 for transmission to a base station. The beam handover module 210 may also receive, via the receiver module 205, information relating to a target beam that the base station may be interested in switching to.

The transmitter module 215 may transmit the one or more signals received from other components of the device 115-a. The transmitter module 215 may transmit information such as packets, user data, and/or control information to a serving cell. The transmitter module 215 may send messages to a millimeter wave base station 105 in conjunction with various synchronization signaling operations, e.g., random access procedures, a BI report listing information relating to the serving beam and the availability of one or more target beams, and other information. In some examples, the transmitter module 215 may be collocated with the receiver module 205 in a transceiver module.

Figure 3:
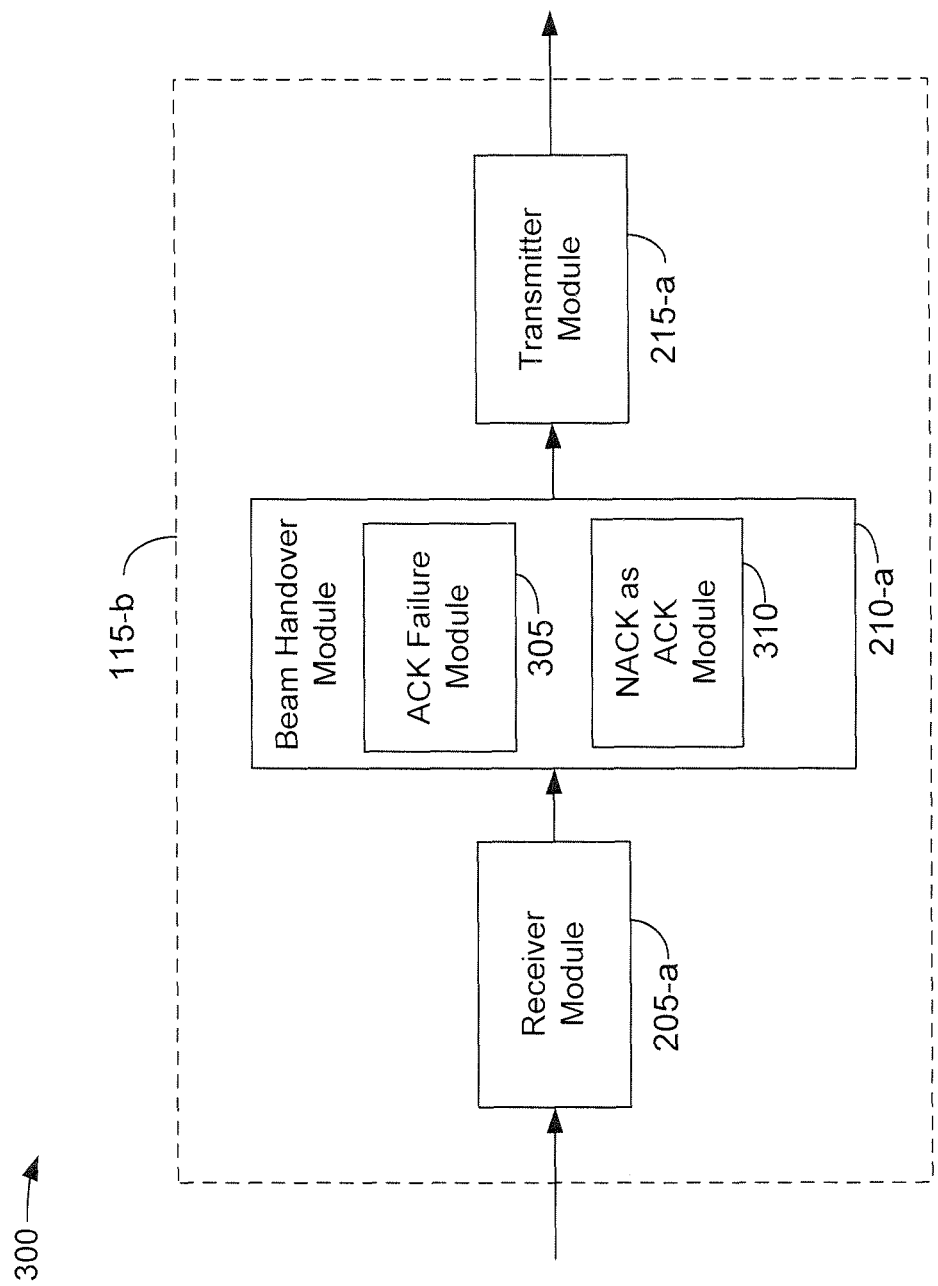
FIG. 3 is a block diagram showing a device configured for use in wireless communication, in accordance with various aspects of the present disclosure.

FIG. 3 is a block diagram 300 of a device 115-b for use in wireless communication, in accordance with various examples. The device 115-b may be an example of one or more aspects of a UE 115 described with reference to FIG. 1. It may also be an example of a device 115-a described with reference to FIG. 2. The device 115-b may include a receiver module 205-a, a beam handover module 210-a, and/or a transmitter module 215-a, which may be examples of the corresponding modules of device 115-a. The device 115-b may also include a processor (not shown). Each of these components may be in communication with each other. The beam handover module 210-a may include one or more of an ACK failure module 305 and a NACK as ACK failure module 310. The receiver module 205-a and the transmitter module 215-a may perform the functions of the receiver module 205 and the transmitter module 215, of FIG. 2, respectively.

The components of the device 115-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The ACK failure module 305 may manage aspects of beam handover for the device 115-b in situations where a beam switch command acknowledgement (ACK) sent by a UE 115 is not received and accurately decoded by the base station 105, the UE 115 switches to the target beam while the base station 105, which is unaware that the UE 115 acknowledged the beam switch command, stays on the serving beam.

The NACK as ACK failure module 310 may manage aspects of beam handover for the device 115-b in situations where the base station may send a communication to the UE 115 informing the UE 115 of a desired target beam, the UE 115 may fail to decode the communication and the UE 115 sends a non-acknowledgement (NACK) to the base station 105. If the base station 105 receives this NACK and interprets it as an ACK, the base station 105 believes that the UE 115 acknowledged the beam switch command, does not retransmit the beam switch command, and switches its transmission to the target beam, while the UE 115 remains on the serving beam.

In an exemplary embodiment, the device 115-b may include other modules (not shown) that may handle other situations where transition from a serving beam to a target beam may be interrupted or not properly performed.

Figure 4:
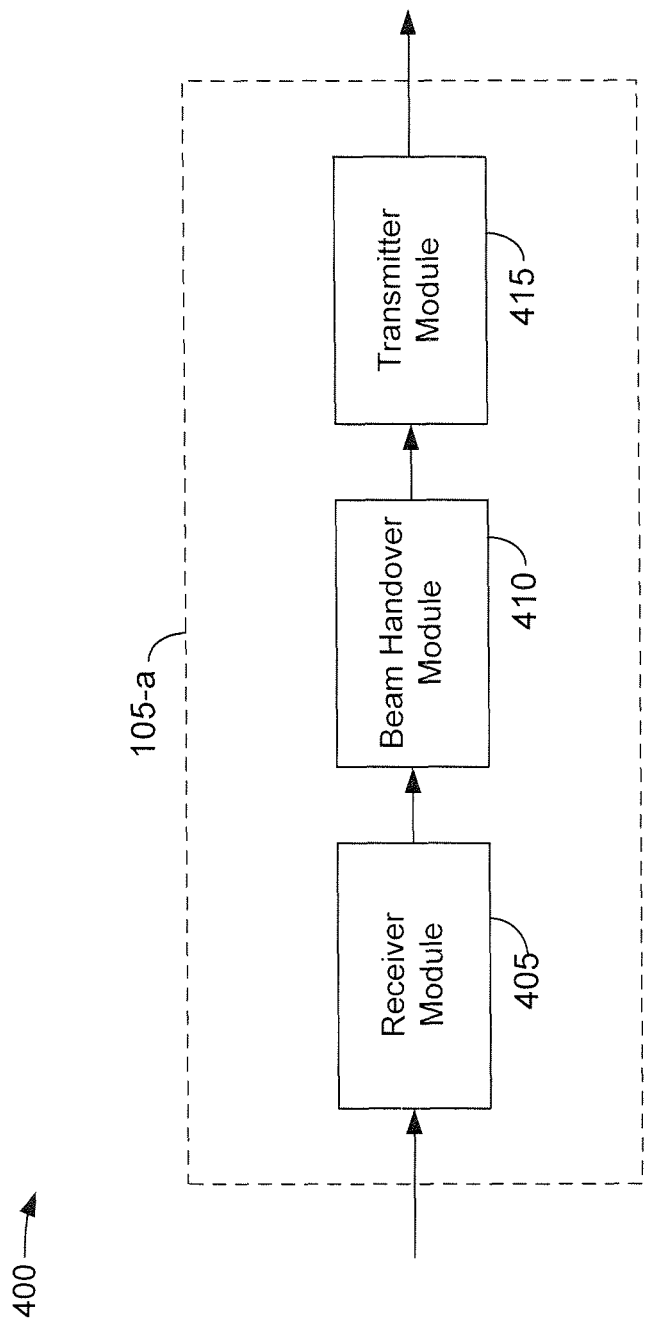
FIG. 4 is a block diagram showing a base station configured for use in wireless communication, in accordance with various aspects of the present disclosure.

FIG. 4 is a block diagram 400 of a base station 105-a for use in wireless communication, in accordance with various aspects of the present disclosure. The base station 105-a may be an example of one or more aspects of a base station 105 described with reference to FIG. 1. The base station 105-a may be a millimeter wave base station, and may also be referred to as an mWB. The base station 105-a may include a receiver module 405, a beam handover module 410, and/or a transmitter module 415. The base station 105-a may also be or include a processor (not shown). Each of these modules may be in communication with each other.

The components of the base station 105-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 405 may receive information such as packets, user data, and/or control information associated with various information channels (e.g., control channels, data channels, etc.). The receiver module 405 may receive messages from a device 115 including information associated with communication beam strength and availability, and other parameters. Information may be passed on to the beam handover module 410, and to other components of the base station 105-a.

The beam handover module 410 may manage communication beam transitions for the base station 105-a. The beam handover module 410 may receive, via the receiver module 405, information relating to a number of communication beams, such as beam information including a BI report from a device 115. The beam handover module 410 may also receive, via the receiver module 405, information relating to a target beam that the base station may be interested in switching to.

The transmitter module 415 may transmit the one or more signals received from other components of the base station 105-a. The transmitter module 415 may transmit information such as packets, user data, and/or control information to a device 115. The transmitter module 415 may send messages to a device 115 in conjunction with various synchronization signaling operations, e.g., random access procedures, a beam switch command to switch to a target beam, and other information. In some examples, the transmitter module 415 may be collocated with the receiver module 405 in a transceiver module.

Figure 5:
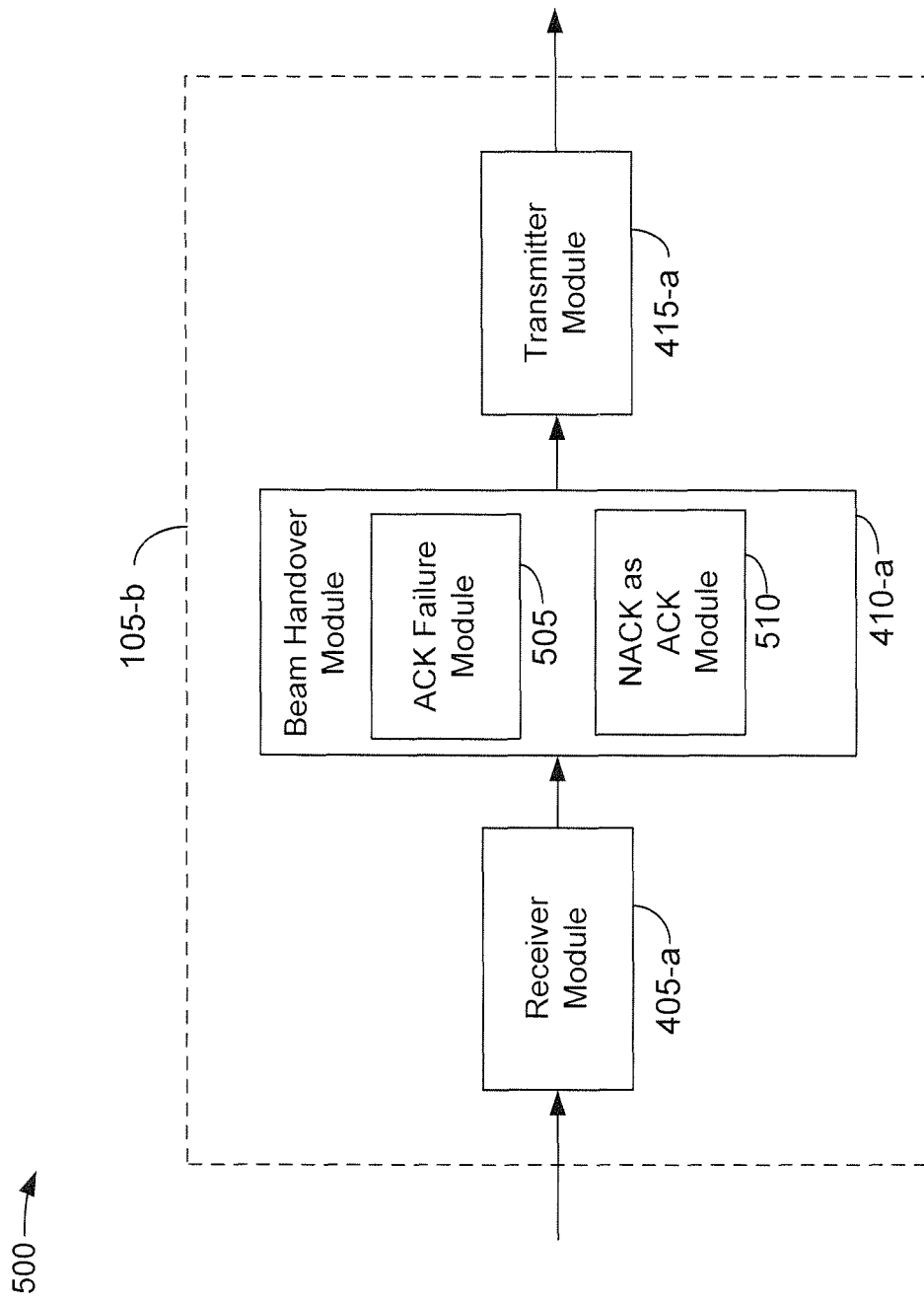
FIG. 5 is a block diagram showing a base station configured for use in wireless communication, in accordance with various aspects of the present disclosure.

FIG. 5 is a block diagram 500 of a base station 105-*b* for use in wireless communication, in accordance with various examples. The base station 105-*b* may be an example of one or more aspects of a base station 105 described with reference to FIG. 1. It may also be an example of a base station 105-*a* described with reference to FIG. 4. The base station 105-*b* may include a receiver module 405-*a*, a beam handover module 410-*a*, and/or a transmitter module 415-*a*, which may be examples of the corresponding modules of base station 105-*a*. The base station 105-*b* may also include a processor (not shown). Each of these components may be in communication with each other. The beam handover module 410-*a* may include an ACK failure module 505 and a NACK as ACK failure module 510. The receiver module 405-*a* and the transmitter module 415-*a* may perform the functions of the receiver module 405 and the transmitter module 415, of FIG. 4, respectively.

The components of the base station 105-*b* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The ACK failure module 505 may manage aspects of beam handover for the base station 105-*b* in situations where the beam switch command acknowledgement (ACK) sent by a UE 115 is not received and accurately decoded by the base station 105, the UE 115 switches to the target beam while the base station 105, which is unaware that the UE acknowledged the beam switch command, stays on the serving beam.

The NACK as ACK failure module 510 may manage aspects of beam handover for the base station 105-*b* in situations where the base station 115 may send a communication to the UE 115 informing the UE 115 of a desired target beam, the UE 115 may fail to decode the communication from the base station 105 and the UE 115 sends a non-acknowledgement (NACK) to the base station 105. If the base station 105-*b* receives this NACK and interprets it as an ACK, the base station 105-*b* believes that the UE 115 acknowledged the beam switch command, does not retransmit the beam switch command, and switches its transmission to the target beam, while the UE 115 remains on the serving beam.

In an exemplary embodiment, the base station 105-*b* may include other modules (not shown) that may handle other situations where transition from a serving beam to a target beam may be interrupted or not properly performed.

Figure 6:
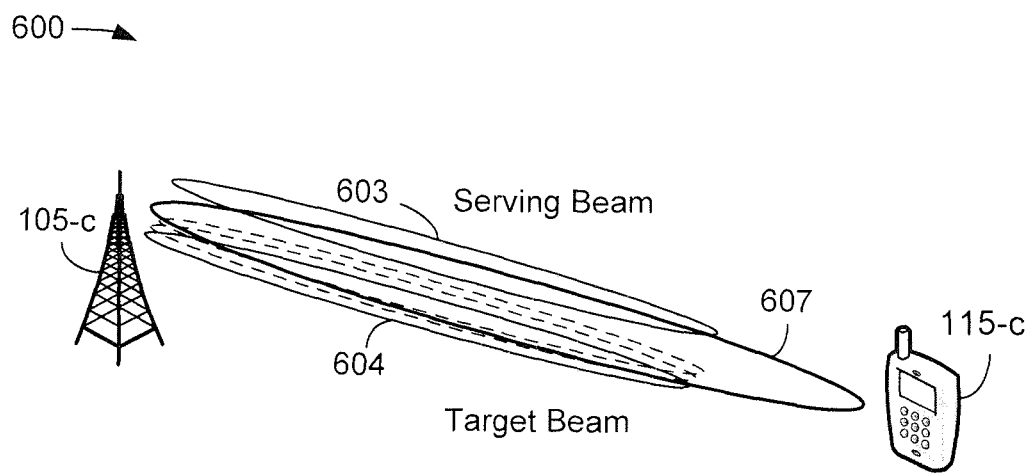
FIG. 6 is a block diagram of a communication system including a base station and a device for use in wireless communication, in accordance with various aspects of the present disclosure.

FIG. 6 is a block diagram 600 of a communication system including a base station 105-*c* and a device 115-*c* for use in wireless communication, in accordance with various aspects of the present disclosure. The base station 105-*c* may be an example of one or more aspects of a base station 105 described with reference to FIG. 1. It may also be an example of a base station 105-*a* described with reference to FIG. 4 or an example of a base station 105-*b* described with reference to FIG. 5.

The device 115-*c* may be an example of one or more aspects of a UE 115 described with reference to FIG. 1. It may also be an example of a device 115-*a* described with reference to FIG. 2 or an example of a device 115-*b* described with reference to FIG. 3.

The device 115-*c* may be in bi-directional wireless communication with the base station 105-*c*. In an exemplary embodiment, the device 115-*c* may be in bi-directional wireless communication with the base station 105-*c* over a serving beam 603. In an exemplary embodiment, the serving beam 603 may be one of a plurality of directional communication beams that may be capable of operatively coupling the device 115-*c* to the base station 105-*c*. In an exemplary embodiment, at a given time, the serving beam 603 may be able to provide the most robust communication link between the device 115-*c* and the base station 105-*c*.

In an exemplary embodiment, a target beam 604 may also be available as a communication link between the device 115-*c* and the base station 105-*c*. The target beam 604 represents one of a plurality of available target beams, with exemplary other target beams being shown in dotted line.

The example shown in FIG. 6 shows an exemplary embodiment of communication beam soft handover. As used herein, the term "soft handover" refers to communication beam handover where the base station and the UE may communicate on both a serving beam and on a target beam until the transition from the serving beam to the target beam is completed by both the base station and the UE. The device 115-*c* may generate and periodically transmit to the base station 105-*c* beam information that may include, for example, a beam index (BI) report listing information relating to the serving beam and one or more available target beams of which the device 115-*c* may be aware. In an exemplary embodiment, the BI report may include the identity of three target beams 604 of which the device 115-*c* may be aware, and which may be available to provide a communication link between the base station 105-*c* and the device 115-*c* should the quality of the serving beam 603 degrade to a point at which radio link failure (RLF) may be imminent. In accordance with an exemplary embodiment, if the base station 105-*c* determines that one of the target beams 604 may provide a communication link that is more robust than the serving beam 603, then the base station 105-*c* can be configured to implement transmission on the serving beam 603 concurrently with transmission on a target beam 604. In such an embodiment, the base station 105-*c* and the device 115-*c* may each transmit a serving beam 603 and a target beam 604 using a different antenna port or antenna operational layer, resulting in both the serving beam 603 and the target beam 604 being simultaneously transmitted by the base station 105-*c* and the device 115-*c*.

In accordance with another exemplary embodiment of concurrently implementing the serving beam 603 and the target beam 604, the base station 105-*c* and the device 115-*c* may each transmit a serving beam 603 and a target beam 604 by synthesizing a new or distorted beam 607, which may include a beam pattern for each of the serving beam 603 and the target beam 604, resulting in both the serving beam 603 and the target beam 604 being simultaneously transmitted and received by the base station 105-*c* and the device 115-*c* over the distorted beam 607. In such an implementation, it is generally accepted that these transmissions will permit a MIMO communication channel. In an exemplary embodiment, the serving beam 603 and the target beam 604 may be widened to include the distorted beam 607. The distorted beam 607 illustrates that the communication beam sent by the base station 105-*c* can be generated to include both the serving beam 603 and the target beam 604, and the communication beam received by the device 115-*c* can include both the serving beam 603 and the target beam 604.

Figure 7:
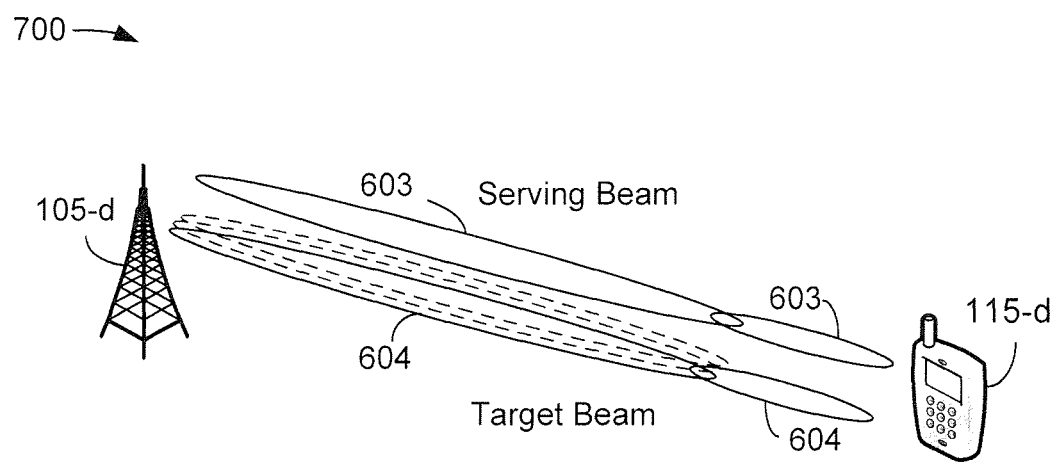
FIG. 7 is a block diagram of a communication system including a base station and a device for use in wireless communication, in accordance with various aspects of the present disclosure.

FIG. 7 is a block diagram 700 of a communication system including a base station 105-d and a device 115-d for use in wireless communication, in accordance with various aspects of the present disclosure. The base station 105-d may be an example of one or more aspects of a base station 105 described with reference to FIG. 1. It may also be an example of a base station 105-a described with reference to FIG. 4, an example of a base station 105-b described with reference to FIG. 5, or an example of a base station 105-c described with reference to FIG. 6.

The device 115-d may be an example of one or more aspects of a UE 115 described with reference to FIG. 1. It may also be an example of a device 115-a described with reference to FIG. 2, an example of a device 115-b described with reference to FIG. 3, or an example of a device 115-c described with reference to FIG. 6.

The device 115-d may be in bi-directional wireless communication with the base station 105-d. In an exemplary embodiment, the device 115-d may be in bi-directional wireless communication with the base station 105-d over a serving beam 603. In an exemplary embodiment, the serving beam 603 may be one of a plurality of directional communication beams that may be configured to operatively couple the device 115-d to the base station 105-d. In an exemplary embodiment, at a given time, the serving beam 603 may be able to provide the most robust communication link between the device 115-d and the base station 105-d.

In an exemplary embodiment, a target beam 604 may also be available as a communication link between the device 115-d and the base station 105-d. The target beam 604 represents one of a plurality of available target beams, with exemplary other target beams being shown in dotted line.

The example shown in FIG. 7 shows an exemplary embodiment of communication beam soft handover. For example, the device 115-d may generate and periodically transmit to the base station 105-d beam information including, for example, a beam index (BI) report listing information relating to the serving beam 603 and one or more available target beams 604 of which the device 115-d may be aware. In an exemplary embodiment, the BI report may include the identity of three target beams 604 of which the device 115-d may be aware, and which may be available to provide a communication link between the base station 105-d and the device 115-d should the quality of the serving beam 603 degrade to a point at which radio link failure (RLF) may be imminent.

In accordance with an exemplary embodiment, if the base station 105-d determines that one of the target beams 604 may provide a communication link that is more robust than the serving beam 603, then the base station 105-d can be configured to implement transmission on the serving beam 603 concurrently with transmission on a target beam 604. In such an embodiment, the base station 105-d and the device 115-d may each transmit a serving beam 603 and a target beam 604 using a different antenna port or antenna operational layer, resulting in both the serving beam 603 and the target beam 604 being simultaneously transmitted by the base station 105-d and the device 115-d. In such an implementation, it is generally accepted that these transmissions will not permit a MIMO communication channel. In an exemplary embodiment, the serving beam 603 and the target beam 604 illustrate using two (2) narrow communication beams, by, for example, splitting, or dividing the antenna element or elements of the base station 105-c and the device 115-c (e.g., the antenna ports) into two groups, thus the rank (capacity) of each beam may be lower than in a situation where the antenna ports are not divided into multiple groups, but simultaneous communication over the serving beam 603 and the target beam 604 is possible.

Figure 8:
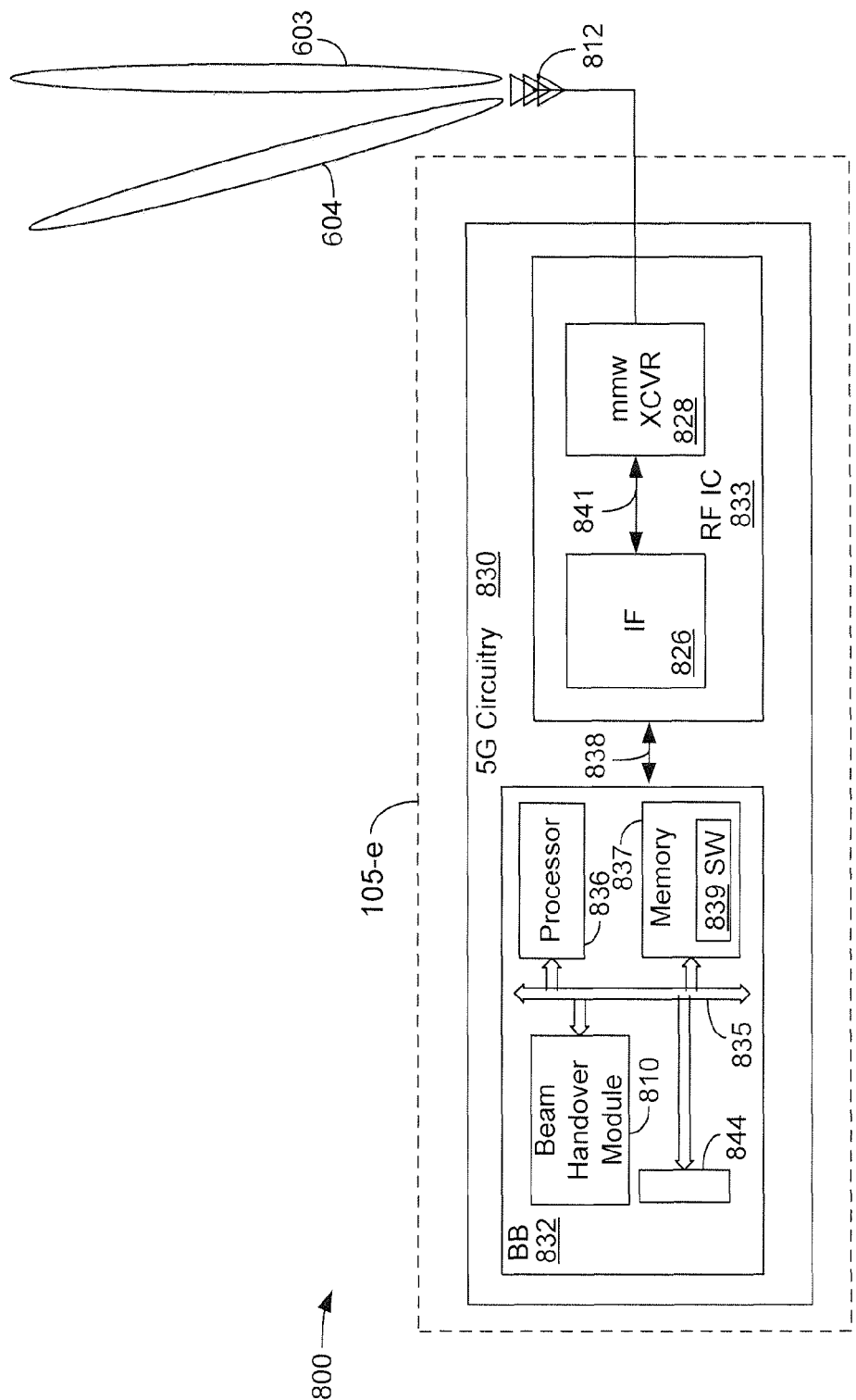
FIG. 8 shows a system for use in wireless communication, in accordance with various aspects of the present disclosure.

FIG. 8 shows a system 800 for use in wireless communication, in accordance with various aspects of the present disclosure. The system 800 may include a base station 105-e, which may be an example of the base station 105 of FIG. 1. The base station 105-e may also be an example of one or more aspects of base stations 105 of FIGS. 4, 5, 6 and/or 7. The base station 105-e may comprise 5G circuitry 830, and other communication circuitry (not shown). Some of the operational elements of the 5G circuitry 830 may be omitted for ease of description, and are known to those having ordinary skill in the art.

The base station 105-e may generally include components for bi-directional voice and data communications including components for transmitting communications and components for receiving communications. The base station 105-e may include an antenna 812 coupled to the 5G circuitry 830. The antenna 812 may comprise one or more antenna elements, may comprise an array, or a phased array, of antenna elements, and may comprise one or more directional and/or omni-directional antenna elements, which may be controlled individually or in groups of two or more elements. The 5G circuitry 830 may be configured to establish a 5G communication channel with a device 115 (not shown). In an exemplary embodiment, the communication channel may comprise the serving beam 603 and one or more target beams 604.

The 5G circuitry 830 may comprise a baseband system 832 and a radio frequency integrated circuit (RFIC) 833, operatively coupled together over a bi-directional connection 838. The baseband system 832 may comprise a processor 836, a memory 837 (including software (SW) 839), a beam handover module 810, and a counter 844, which may communicate, directly or indirectly, with each other (e.g., via one or more buses 835). The counter 844 may be configured as a communication subframe (SF) counter. The RFIC 833 may comprise an intermediate frequency (IF) sub-system 826 and a transceiver module 828 operatively coupled together over a bi-directional connection 841. In an exemplary embodiment, the transceiver module 828 may be configured to communicate over millimeter wave (mmw) frequencies. The transceiver module 828 may communicate bi-directionally, via the antenna(s) 812 and/or one or more wired or wireless links, with one or more networks, as described above. For example, the transceiver module 828 may communicate bi-directionally with devices 115 (not shown). The transceiver module 828 may include a modem to modulate the packets and provide the modulated packets to the antenna(s) 812 for transmission, and to demodulate packets received from the antenna(s) 812. While the base station 105-e may include a single antenna 812 the base station 105-e may have multiple antennas capable of concurrently transmitting and/or receiving multiple wireless transmissions via carrier aggregation techniques, for example. The transceiver module 828 may be capable of concurrently communicating with one or more devices 115 via multiple component carriers.

The base station 105-e may include a beam handover module 810, which may perform the functions described above for the beam handover module 410 of base stations 105 of FIGS. 1, 4, 5, 6 and/or 7. In an exemplary embodiment, the beam handover module 810 may be configured to communicate with a device 115 to transition from a serving beam 603 to a target beam 604 as described herein.

The memory 837 may include random access memory (RAM) and read-only memory (ROM). The memory 837 may store computer-readable, computer-executable software/firmware code 839 containing instructions that, when executed, cause the processor 836 to perform various functions described herein (e.g., perform synchronization operations, synchronize reference timing parameters, beam transition operations, etc.). Alternatively, the computer-readable, computer-executable software/firmware code 839 may not be directly executable by the processor 836 but cause a computer (e.g., when compiled and executed) to perform functions described herein. The processor 836 may include an intelligent hardware device, e.g., a central processing unit (CPU), a microcontroller, an application-specific integrated circuit (ASIC), etc.

Figure 9:
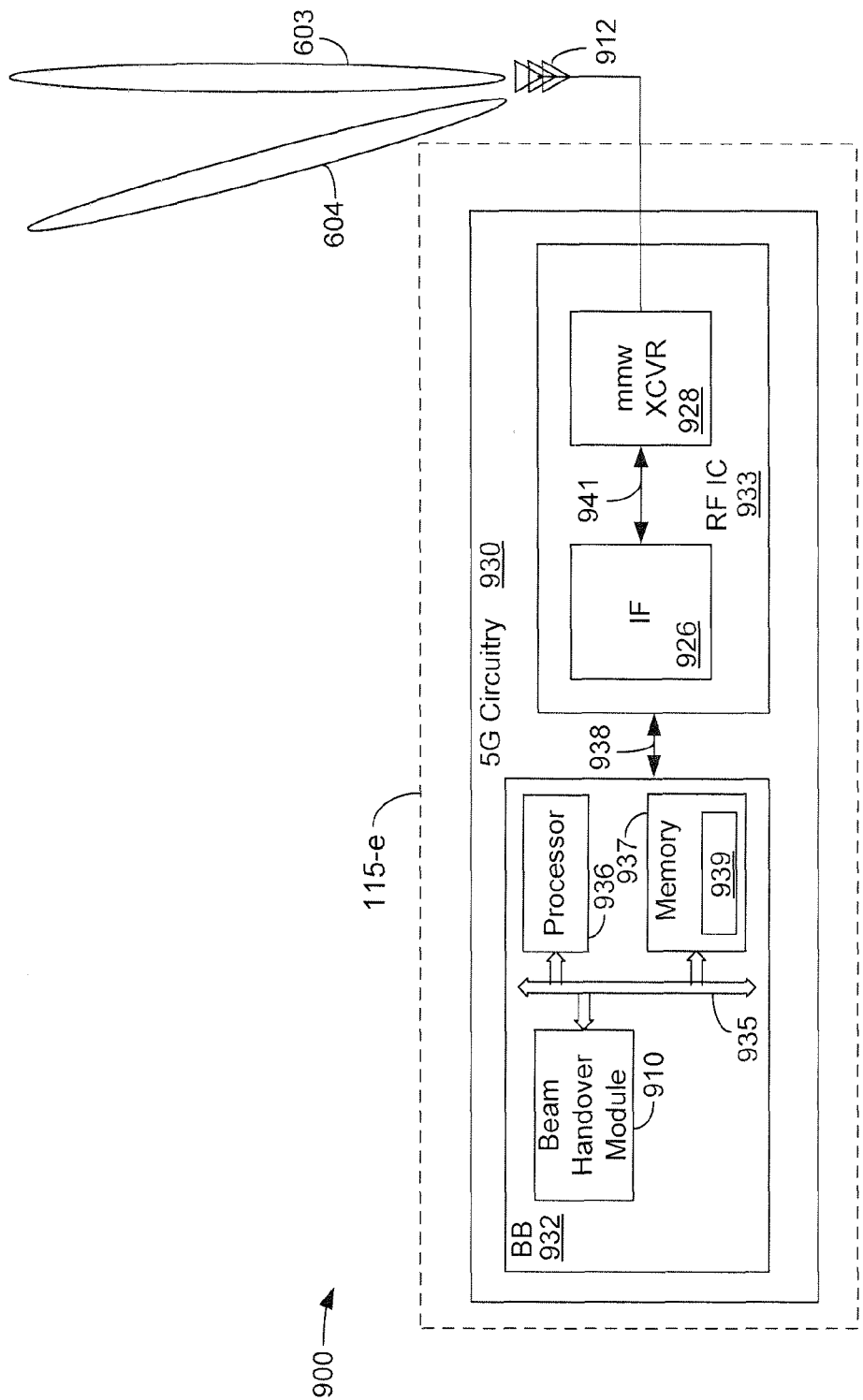
FIG. 9 shows a system for use in wireless communication, in accordance with various aspects of the present disclosure.

FIG. 9 shows a system 900 for use in wireless communication, in accordance with various aspects of the present disclosure. The system 900 may include a device 115-e, which may be an example of the UE 115 of FIG. 1. The device 115-e may also be an example of one or more aspects of devices 115 of FIGS. 2, 3, 6 and/or 7. The device 115-e may comprise 5G circuitry 930 and other communication circuitry (not shown). Some of the operational elements of the 5G circuitry 930 may be omitted for ease of description, and are known to those having ordinary skill in the art.

The device 115-e may generally include components for bi-directional voice and data communications including components for transmitting communications and components for receiving communications. The device 115-e may include an antenna 912 coupled to the 5G circuitry 930. The antenna 912 may comprise one or more antenna elements, may comprise an array, or a phased array, of antenna elements, and may comprise one or more directional and/or omni-directional antenna elements, which may be controlled individually or in groups of two or more elements. The 5G circuitry 930 may be configured to establish a 5G communication channel with a base station 105 (not shown). In an exemplary embodiment, the communication channel may comprise the serving beam 603 and one or more target beams 604.

The 5G circuitry 930 may comprise a baseband system 932 and a radio frequency integrated circuit (RFIC) 933 operatively coupled together over a bi-directional connection 938. The baseband system 932 may comprise a processor 936, a memory 937 (including software (SW) 939), and a beam handover module 910, which each may communicate, directly or indirectly, with each other (e.g., via one or more buses 935). The RFIC 933 may comprise an intermediate frequency (IF) sub-system 926 and a transceiver module 928 operatively coupled together over a bi-directional connection 941. In an exemplary embodiment, the transceiver module 928 may be configured to communicate over millimeter wave (mmw) frequencies. The transceiver module 928 may communicate bi-directionally, via the antenna(s) 912 and/or one or more wired or wireless links, with one or more networks, as described above. For example, the transceiver module 928 may communicate bi-directionally with base stations 105 (not shown), with other UEs 115, and/or with devices 115 with reference to FIG. 1, 2, 3, 6 or 7. The transceiver module 928 may include a modem to modulate the packets and provide the modulated packets to the antenna(s) 912 for transmission, and to demodulate packets received from the antenna(s) 912. While the UE 115-e may include a single antenna 912 for the 5G circuitry 530, the UE 115-e may have multiple antennas capable of concurrently transmitting and/or receiving multiple wireless transmissions via carrier aggregation techniques, for example. The transceiver module 928 may be capable of concurrently communicating with one or more base stations 105 via multiple component carriers.

The device 115-e may include a beam handover module 910, which may perform the functions described above for the beam handover module 210 of devices 115 of FIGS. 1, 2, 3, 6 and/or 7. In an exemplary embodiment, the beam handover module 910 may be configured to communicate with a base station 105 to transition from a serving beam 603 to a target beam 604 as described herein.

The memory 937 may include random access memory (RAM) and read-only memory (ROM). The memory 937 may store computer-readable, computer-executable software/firmware code 939 containing instructions that, when executed, cause the processor 936 to perform various functions described herein (e.g., perform synchronization operations, synchronize reference timing parameters, beam transition operations, etc.). Alternatively, the computer-readable, computer-executable software/firmware code 939 may not be directly executable by the processor 936 but cause a computer (e.g., when compiled and executed) to perform functions described herein. The processor 936 may include an intelligent hardware device, e.g., a central processing unit (CPU), a microcontroller, an application-specific integrated circuit (ASIC), etc.

Figure 10:
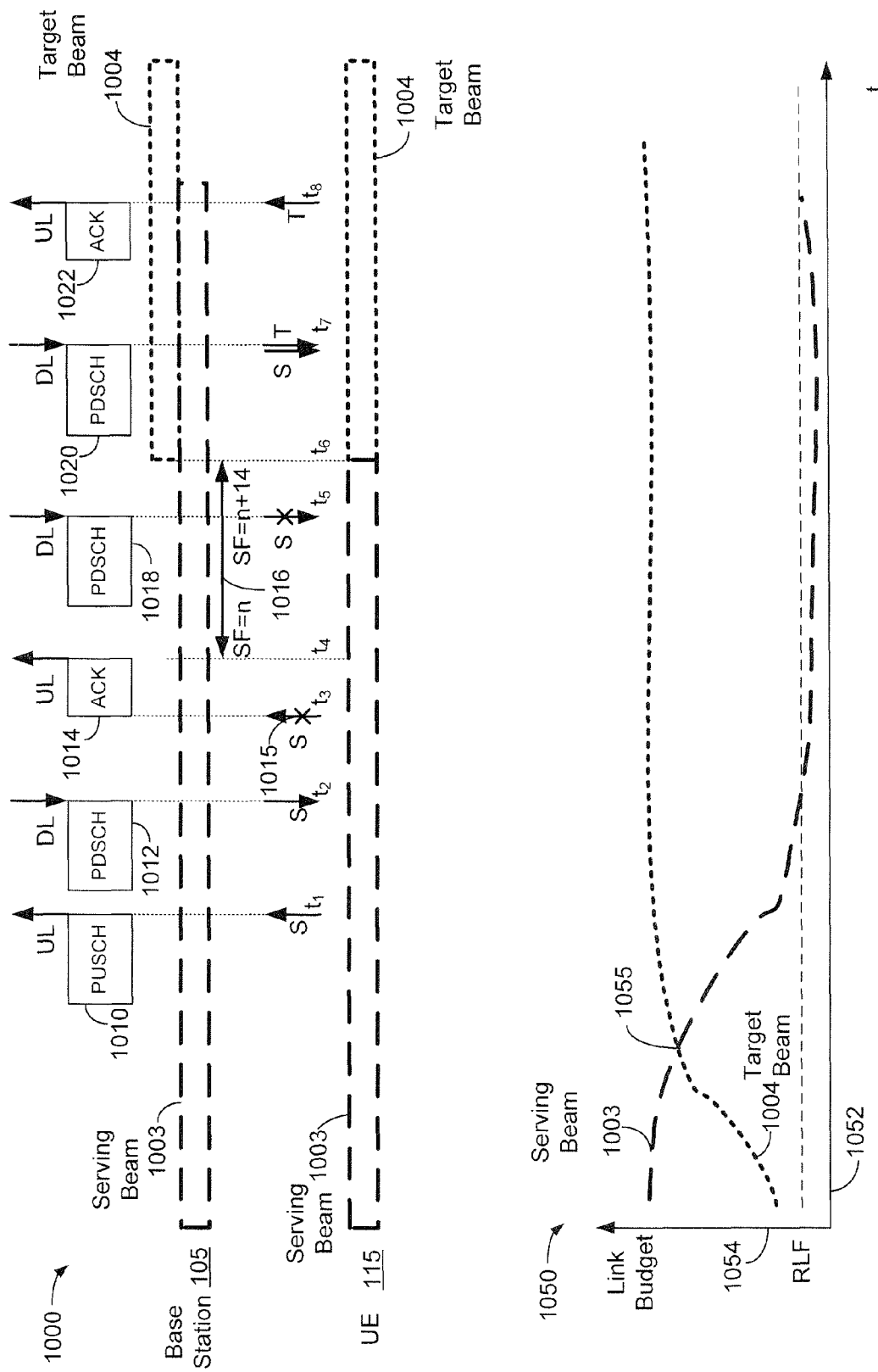
FIG. 10 is a timing diagram for use in wireless communication, in accordance with various aspects of the present disclosure.

FIG. 10 is a timing diagram 1000 for use in wireless communication, in accordance with various aspects of the present disclosure. The timing diagram 1000 illustrates an exemplary embodiment of a communication beam soft handover in a situation where, after receiving beam information, such as a beam index (BI) report, from a UE informing the base station of the availability of a target beam that may offer a more robust radio link than the serving beam, the base station 105 sends a communication to the UE 115 informing the UE of the desired target beam, in response to which the UE 115 sends an acknowledgement (ACK) to the base station. However, the ACK may not be received and accurately decoded by the base station 105 allowing the UE 115 to switch to the target beam while the base station 105, which is unaware that the UE 115 acknowledged the beam switch command, stays on the serving beam 1003, resulting in a radio link failure (RLF) between the base station 105 and the UE 115.

A graphical illustration 1050 has a horizontal axis 1052 representing time increasing to the right and a vertical axis 1054 representing available communication bandwidth (referred to as "link budget") increasing upwardly. The term "RLF" represents radio link failure, which is the point at which there is insufficient link budget available on a particular beam to maintain radio communication between a base station 105 and a device 115. The graphical illustration 1050 shows the serving beam 1003 and the target beam 1004, and shows a point 1055 at which the quality of the serving beam 1003 and the target beam 1004 are equal. In an exemplary embodiment, the quality of the serving beam 1003 decreases with time and the quality of the target beam 1004 increases with time.

In an exemplary embodiment, at a time prior to time t1, a base station 105 and a device 115 are in bi-directional wireless communication over a serving beam 1003, as described herein.

At a time t1, the UE 115 sends a communication 1010 over the physical uplink shared channel (PUSCH), to the base station 105. The communication 1010 may include, among other information, beam state information (BSI), beam refinement information (BRI), and beam index (BI) information, collectively referred to herein as beam information. In an exemplary embodiment, the beam information may include, from the UEs perspective, the status of the serving beam 1003 and a status of one or more target beams 1004 that may be available to the UE 115. The base station 105 also tracks for each UE 115 the serving beam 1003 and one or more target beams 1004. Communications on the serving beam 1003 are denoted using the nomenclature "S" and communications on the target beam 1004 are denoted using the nomenclature "T".

At time t2, the base station observes that a target beam 1004 has better characteristics than the serving beam 1003, and sends a communication 1012 to the UE 115 over the physical downlink shared channel (PDSCH). The communication 1012 may include a beam switch command (also referred to as a beam transition command or a beam transition) instructing the UE 115 to switch from the serving beam 1003 to the target beam 1004.

At time t3, the UE 115 sends a communication 1014 to the base station 105 acknowledging (ACK) the beam switch command sent at time t2. However, in an exemplary embodiment, the communication 1014 including the beam switch ACK from the UE 115 may not be received and/or accurately decoded by the base station 105, indicated by the "X" 1015.

At time t4, the base station 105 realizes that the ACK sent by the UE 115 has not been properly received and decoded, sets a subframe (SF) counter (for example, counter 844 in FIG. 8) to a number of predetermined subframes, for example, n subframes+14, shown using reference numeral 1016, and at time t5, resends a communication 1018 to the UE 115 over the PDSCH after 14 subframes have elapsed from time t4. The communication 1018 may include a resending of the beam switch command instructing the UE 115 to switch from the serving beam 1003 to the target beam 1004. However, because the downlink to the UE 115 may already be compromised, the UE 115, which has already sent the ACK in communication 1014, may not be aware of the base station 105 resending the beam switch command in communication 1018.

At time t6, the UE 115 switches to the target beam 1004, while the base station 105 remains on the serving beam 1003. In accordance with an exemplary embodiment, at time t6, the base station 105 continues transmitting on the serving beam 1003, and simultaneously begins transmitting to the UE 115 on the target beam 1004. At a time t7, the base station 105 sends a communication 1020 including a beam switch command over the PDSCH on both the serving beam 1003 and the target beam 1004.

At time t8, because the UE 115 was able to receive the communication 1020 on the target beam 1004, the UE 115 sends a communication (ACK) 1022 to the base station 105 acknowledging the beam switch command sent at time t7, and remains on the target beam 1004. The base station may receive and properly decode this ACK communication 1022 from the UE 115, and may then cease transmitting on the serving beam 1003, remain transmitting on the target beam 1004, at which time the target beam 1004 becomes the then-current serving beam.

Figure 11:
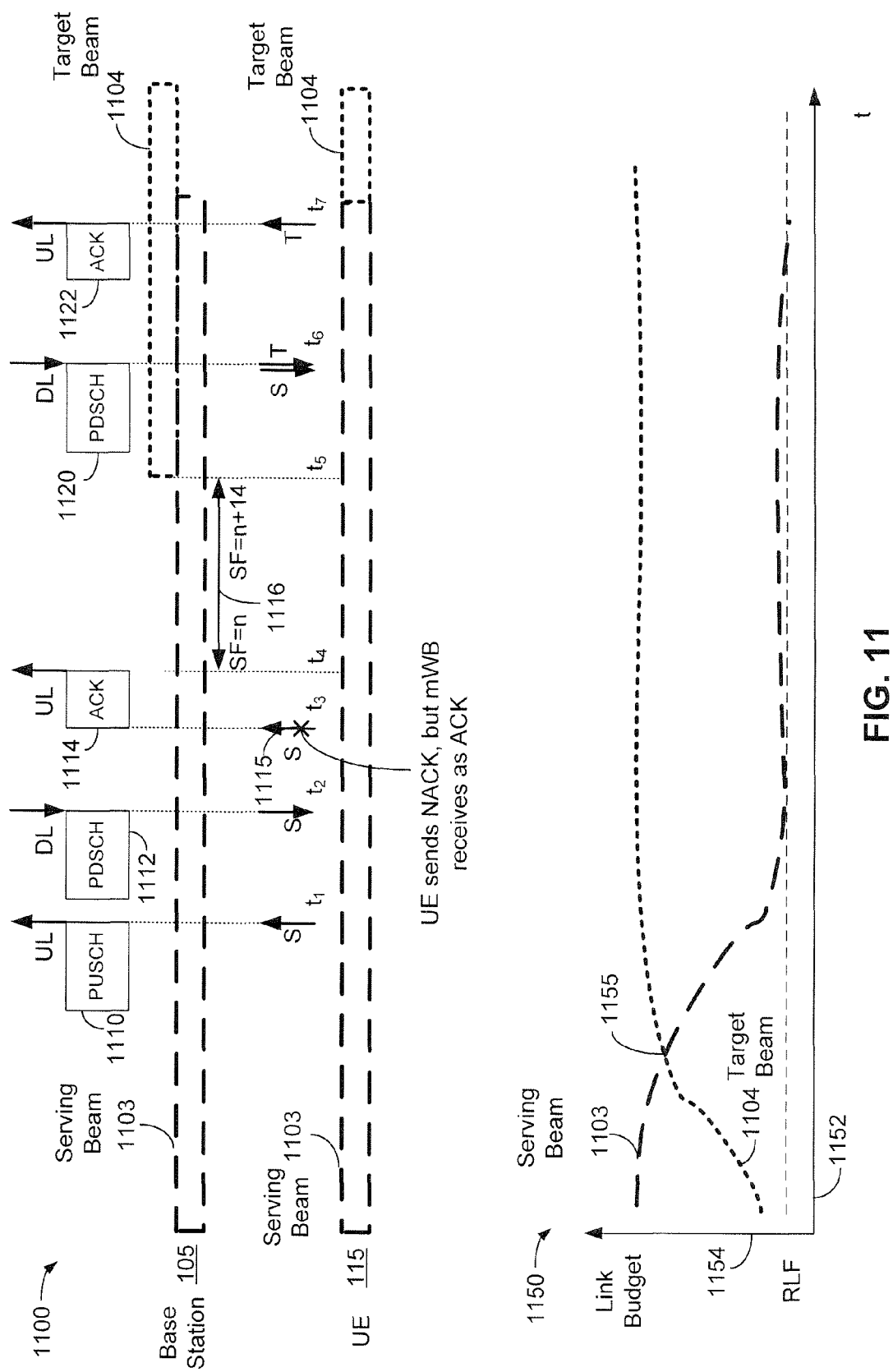
FIG. 11 is a timing diagram for use in wireless communication, in accordance with various aspects of the present disclosure.

FIG. 11 is a timing diagram 1100 for use in wireless communication, in accordance with various aspects of the present disclosure. The timing diagram 1100 illustrates an exemplary embodiment of a communication beam soft handover in a situation where, after receiving a BI report from a UE 115 informing the base station 105 of the availability of a target beam that may offer a more robust radio link than the serving beam, the base station 105 may send a communication to the UE 115 informing the UE 115 of the desired target beam, but the UE 115 may fail to decode the communication and the UE 115 sends a non-acknowledgement (NACK) to the base station 105. However, the base station 105 may receive this NACK and interpret it as an acknowledgement (ACK), whereby the base station 105 believes that the UE 115 acknowledged the beam switch command, does not retransmit the beam switch command, and switches its transmission to the target beam, while the UE 115 remains on the serving beam resulting in a radio link failure (RLF) between the base station 105 and the UE 115.

A graphical illustration 1150 has a horizontal axis 1152 representing time increasing to the right and a vertical axis 1154 representing available communication bandwidth (referred to as "link budget") increasing upwardly. The term "RLF" represents radio link failure, which is the point at which there is insufficient link budget available on a particular beam to maintain radio communication between a base station 105 and a device 115. The graphical illustration 1150 shows the serving beam 1103 and the target beam 1104, and shows a point 1155 at which the quality of the serving beam 1103 and the target beam 1104 are equal. In an exemplary embodiment, the quality of the serving beam 1103 decreases with time and the quality of the target beam 1104 increases with time.

In an exemplary embodiment, at a time prior to time t1, a base station 105 and a device 115 are in bi-directional wireless communication over a serving beam 1003, as described herein.

At a time t1, the UE 115 sends a communication 1110 over the PUSCH, to the base station 105. The communication 1110 may include, among other information, beam state information (BSI), beam refinement information (BRI), and beam index (BI) information, collectively referred to herein as beam information. In an exemplary embodiment, the beam information may include, from the UEs perspective, the status of the serving beam 1103 and a status of one or more target beams 1104 that may be available to the UE 115. The base station 105 also tracks for each UE 115 the serving beam 1103 and one or more, target beams 1104.

At time t2, the base station observes that a target beam 1104 has better characteristics than the serving beam 1103, and sends a communication 1112 to the UE 115 over the PDSCH. The communication 1112 may include a beam switch command (also referred to as a beam transition command or a beam transition) instructing the UE 115 to switch from the serving beam 1103 to the target beam 1104.

At time t3, the UE 115 cannot decode the beam switch command sent in the communication 1112 and sends a communication 1114 to the base station 105 non-acknowledging (NACK) the beam switch command sent at time t2. However, in an exemplary embodiment, the communication 1114 including the beam switch NACK sent by the UE 115 may not be received and/or accurately decoded by the base station 105, indicated by the "X" 1115. For example, instead of receiving the NACK as intended by the UE 115, the base station 105 may interpret the NACK as an acknowledgement (ACK).

At time t4, the base station 105 believing it has received an ACK from the UE 115 on the beam switch instruction, sets a subframe counter (such as the counter 844 in FIG. 8) to a number of predetermined subframes, for example, n subframes+14, shown using reference numeral 1116, and prepares to switch to the target beam 1104 after 14 subframes elapsed from time t4.

At time t5, the base station 105 switches to the target beam 1104, while the device 115 remains on the serving beam 1103. In accordance with an exemplary embodiment, at time t5, the base station 105 continues transmitting on the serving beam 1103, and simultaneously begins transmitting to the UE 115 on the target beam 1104 after 14 subframes have elapsed from time t4.

At time t6, the base station 105 sends a communication 1120 to the UE 115 over the PDSCH on both the serving beam 1103 and the target beam 1104. The communication 1120 may include a beam switch command, as described herein.

At time t7, because the UE 115 was able to receive the communication 1120 on the serving beam 1103, the UE 115 sends a communication (ACK) 1122 to the base station 105 acknowledging the beam switch command sent at time t6, and can then switch to the target beam 1104. The base station may receive and properly decode this ACK communication 1122 from the UE 115, and may then cease transmitting on the serving beam 1103 and switch to the target beam 1104, at which time the target beam 1104 becomes the then-current serving beam.

To finalize the beam switch procedure, the base station 105 has to be certain that the device 115 has switched to the correct target beam and the UE 115 should acknowledge the beam switch to the base station 105. For example, a "beam switch complete" signal may allow the base station 105 to identify the beam used by the UE 115, for example, by using the PDSCH ACK communication. The UE 115 should have the ability to detect and identify the beam being transmitted by the base station 105 and then ACK on it. An example of a way of sending the beam ID to the UE 115 may include, fin traffic mode, the base station 105 transmitting will a DL DCI (downlink control information) message that indicate the beam index (BI), or new beam information may be sent over the physical downlink control channel (PDCCH), over the PDSCH, or any combination of these.

The UE 115 may acknowledge the beam switch completion using the ACK/NACK messages, and embedding the beam switching information therein. The NACK/ACK signal may comprise two (2) bits with the following values:
  00—NACK
  01—ACK
  02—ACK On every beam switch, the UE 115 may alter the ACK value between 01<->02, meaning, if the UE 115 used ACK=01 in the current beam, then it may alter the ACK value to be ACK=02 in the target beam. On the next beam switch the UE 115 may revert to ACK=01 and so forth. The base station 105 may monitor the ACK value to determine the beam used by the UE 115. Other alternatives include, for example, transmitting an explicit beam indication in the ACK communication.

In an alternative exemplary embodiment, a situation that is similar to the situation where a NACK sent by the UE is interpreted as an ACK by the base station is where the UE did not receive the beam switch command from the base station, and thus did not reply with an ACK nor a NACK. However, the base station may have wrongly determined that an ACK was sent and the soft handover process described in FIG. 11 may be used to perform a soft communication beam handover.

In another alternative exemplary embodiment, a situation could arise where the base station may have transitioned to a target beam, which, for any of a number of reasons, cannot be received by the UE, for example, due to blocking, or perhaps the quality of the target beam deteriorating during the beam switch procedure. In such a situation, the connection will likely fail unless both the base station and the UE maintain communication on the serving beam and thus can utilize the serving beam for beam recovery.

Figure 12:
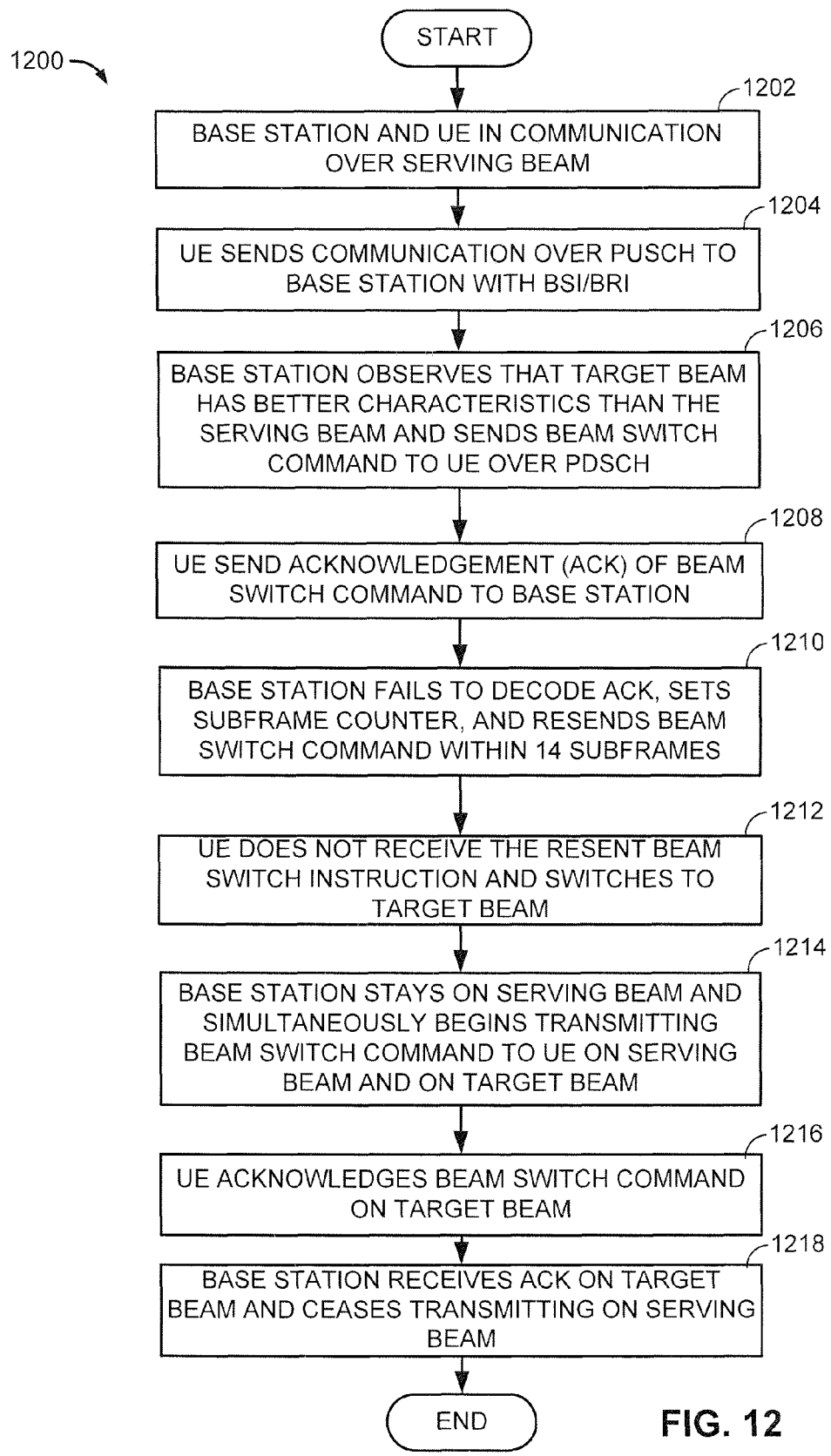
FIG. 12 is a flow chart illustrating an example of a method for communication, in accordance with various aspects of the present disclosure.

FIG. 12 is a flow chart 1200 illustrating an example of a method for communication, in accordance with various aspects of the present disclosure. The blocks in the method 1200 can be performed in or out of the order shown, and in some embodiments, can be performed at least in part in parallel.

In block 1202, the base station 105 and the UE 115 are communicating over a serving beam.

In block 1204, the UE 115 sends a communication over the PUSCH, to the base station 105. The communication may include, among other information, beam state information (BSI), beam refinement information (BRI), and beam index (BI) information, collectively referred to herein as beam information. In an exemplary embodiment, the beam information may include, from the UEs perspective, the status of the serving beam and a status of one or more target beams that may be available to the UE 115.

In block 1206, the base station 105 observes that a target beam has better characteristics than the serving beam, and sends a communication to the UE 115 over the PDSCH. The communication may include a beam switch command instructing the UE 115 to switch from the serving beam to the target beam.

In block 1208, the UE 115 sends a communication to the base station 105 acknowledging (ACK) the beam switch command sent in block 1206. However, in an exemplary embodiment, the communication including the beam switch ACK may not be received and/or accurately decoded by the base station 105.

In block 1210, the base station 105 realizes that the ACK sent by the UE 115 has not been properly received and decoded, sets a subframe counter to a number of subframes, for example, n subframes+14, and resends a communication to the UE 115 over the PDSCH. The communication may include a resending of the beam switch command instructing the UE 115 to switch from the serving beam to the target beam.

In block 1212, because the downlink to the UE 115 may already be compromised, the UE 115, which has already sent the ACK, may not be aware of the base station 105 resending the beam switch command and switches to the target beam, while the base station remains on the serving beam.

In block 1214, the base station 105 continues transmitting on the serving beam, and simultaneously begins transmitting to the UE 115 on the target beam. For example, after 14 subframes have elapsed, the base station 105 sends a communication to the UE 115 over the PDSCH on both the serving beam and the target beam.

In block 1216, because the UE 115 was able to receive the communication on the target beam, the UE 115 sends a communication (ACK) to the base station 105 acknowledging the beam switch command, and remains on the target beam 1004.

In block 1218, the base station may receive and properly decode this ACK communication from the UE 115 on the target beam, and may then cease transmitting on the serving beam, at which time the target beam becomes the then-current serving beam.

Figure 13:
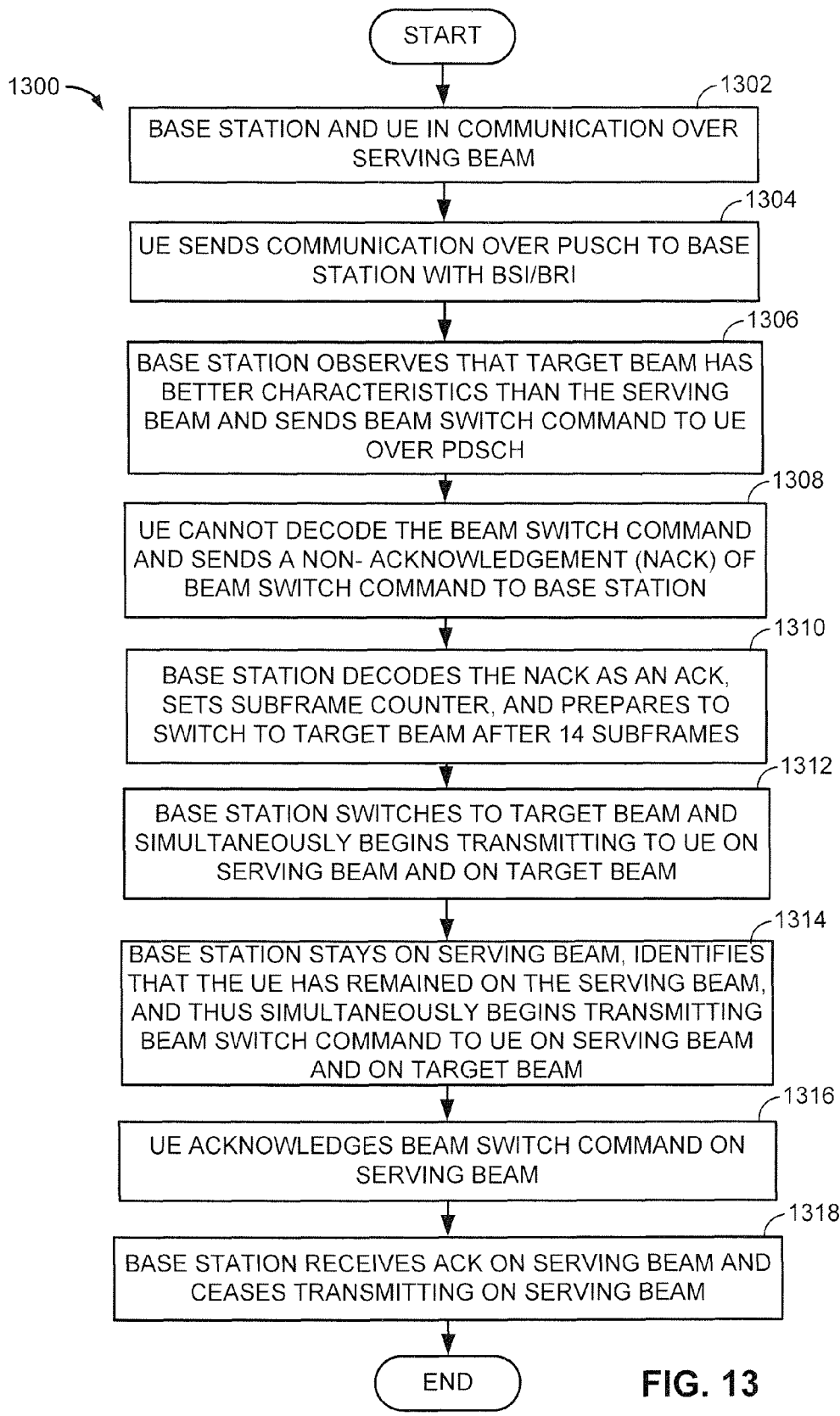
FIG. 13 is a flow chart illustrating an example of a method for communication, in accordance with various aspects of the present disclosure.

FIG. 13 is a flow chart 1300 illustrating an example of a method for communication, in accordance with various aspects of the present disclosure. The blocks in the method 1300 can be performed in or out of the order shown, and in some embodiments, can be performed at least in part in parallel.

In block 1302, the base station 105 and the UE 115 are communicating over a serving beam.

In block 1304, the UE 115 sends a communication over the PUSCH, to the base station 105. The communication may include, among other information, beam state information (BSI), beam refinement information (BRI), and beam index (BI) information, collectively referred to herein as beam information. In an exemplary embodiment, the beam information may include, from the UEs perspective, the status of the serving beam and a status of one or more target beams that may be available to the UE 115.

In block 1306, the base station 105 observes that a target beam has better characteristics than the serving beam, and sends a communication to the UE 115 over the PDSCH. The communication may include a beam switch command instructing the UE 115 to switch from the serving beam to the target beam.

In block 1308, the UE 115 cannot decode the beam switch command sent by the base station in block 1306 and sends a communication to the base station 105 non-acknowledging (NACK) the beam switch command sent in block 1306.

In block 1310, the beam switch NACK sent by the UE in block 1308 may not be received and/or accurately decoded by the base station 105. For example, instead of receiving the NACK as intended by the UE 115, the base station 105 may interpret the NACK as an acknowledgement (ACK). The base station 105 believing it has received an ACK from the UE 115 on the beam switch instruction, sets a subframe counter to a number of subframes, for example, n subframes+14, and prepares to switch to the target beam after 14 subframes.

In block 1312, the base station 105 switches to the target beam, while the UE 115 remains on the serving beam. In accordance with an exemplary embodiment, the base station 105 continues transmitting on the serving beam, and simultaneously begins transmitting to the UE 115 on the target beam.

In block 1314, after 14 subframes have elapsed, the base station 105 identifies that the UE 115 has remained on the serving beam, and thus sends a communication to the UE 115 over the PDSCH on both the serving beam and the target beam. The communication may include the beam switch command on both the serving beam and the target beam.

In block 1316, because the UE 115 was able to receive the communication sent in block 1314 on the serving beam, the UE 115 sends a communication (ACK) to the base station 105 acknowledging the beam switch command sent in block 1314, and can then switch to the target beam.

In block 1318, the base station 105 may receive and properly decode this ACK communication from the UE 115, and may then cease transmitting on the serving beam, at which time the target beam becomes the then-current serving beam.

Figure 14:
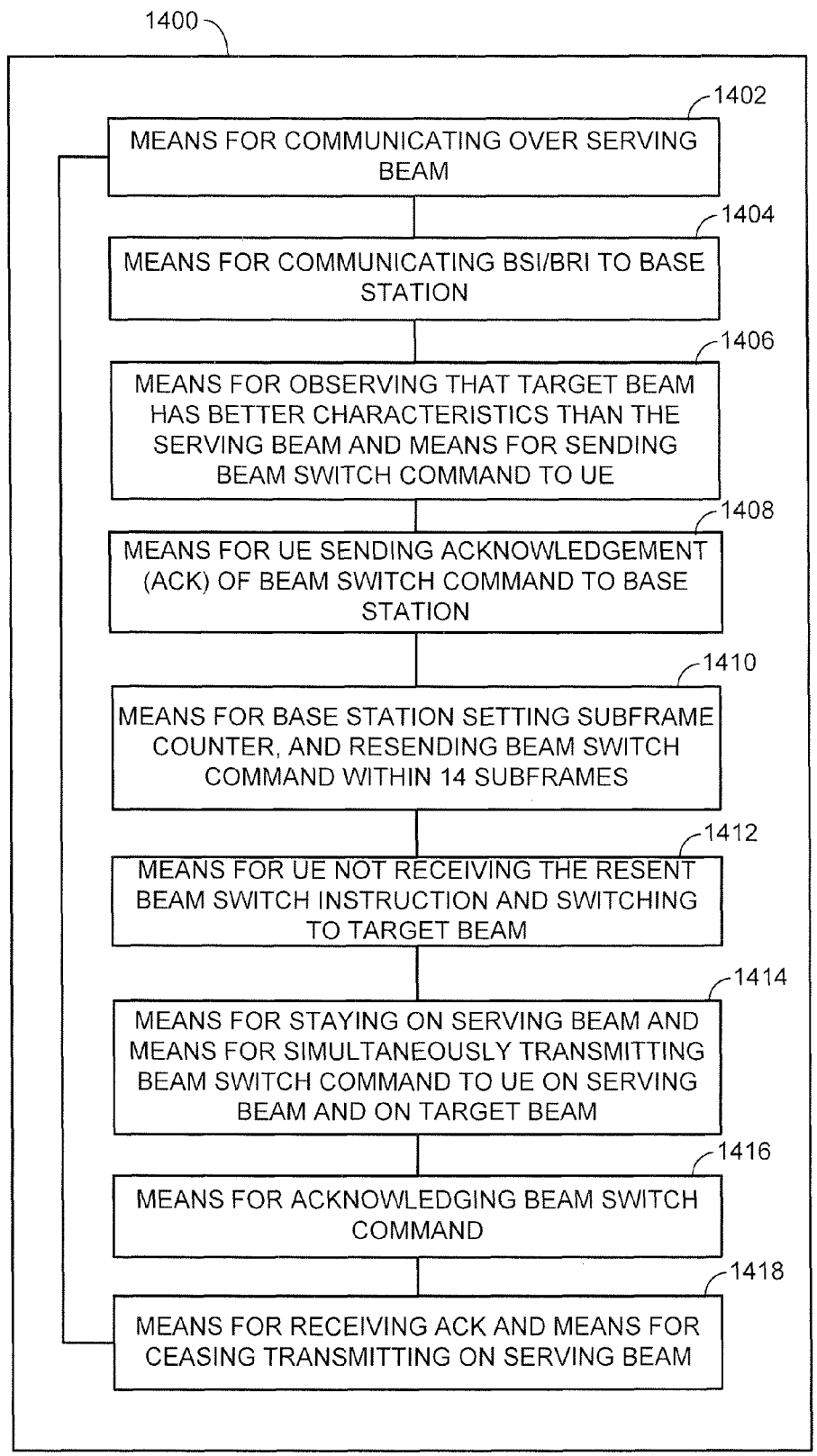
FIG. 14 is a functional block diagram of an apparatus for communication, in accordance with various aspects of the present disclosure.

FIG. 14 is a functional block diagram of an apparatus 1400 for communication, in accordance with various aspects of the present disclosure. The apparatus 1400 comprises means 1402 for communicating over a serving beam. In certain embodiments, the means 1402 for communicating over a serving beam can be configured to perform one or more of the functions described in operation block 1202 of method 1200 (FIG. 12). In an exemplary embodiment, the means 1402 for communicating over a serving beam may comprise the base station 105 communicating with the UE 115 over a serving beam 603.

The apparatus 1400 further comprises means 1404 for communicating information, such as beam information including, for example, beam state information (BSI), beam refinement information (BRI), and beam index (BI) information, collectively referred to herein as beam information. In certain embodiments, the means 1404 for communicating information can be configured to perform one or more of the functions described in operation block 1204 of method 1200 (FIG. 12). In an exemplary embodiment, the means 1404 for communicating information may comprise the UE 115 sending a communication over the PUSCH, to the base station 105. The communication may include, among other information, beam state information (BSI), beam refinement information (BRI), and beam index (BI) information, collectively referred to herein as beam information. In an exemplary embodiment, the beam information may include, from the UEs perspective, the status of the serving beam and a status of one or more target beams that may be available to the UE 115.

The apparatus 1400 further comprises means 1406 for observing that a target beam may have better characteristics than a serving beam and means for sending a beam switch command. In certain embodiments, the means 1406 for observing that a target beam may have better characteristics than a serving beam and means for sending a beam switch command can be configured to perform one or more of the functions described in operation block 1206 of method 1200 (FIG. 12). In an exemplary embodiment, the means 1406 for observing that a target beam may have better characteristics than a serving beam and means for sending a beam switch command may comprise the base station 105 observing that a target beam has better characteristics than the serving beam, and sending a communication to the UE 115 over the PDSCH. The communication may include a beam switch command instructing the UE 115 to switch from the serving beam to the target beam.

The apparatus 1400 further comprises means 1408 for the UE sending acknowledgement (ACK) of beam switch command to the base station. In certain embodiments, the means 1408 for the UE sending acknowledgement (ACK) of beam switch command to the base station can be configured to perform one or more of the functions described in operation block 1208 of method 1200 (FIG. 12). In an exemplary embodiment, the means 1408 for the UE sending acknowledgement (ACK) of beam switch command to the base station may comprise the UE 115 sending a communication to the base station 105 acknowledging (ACK) the beam switch command sent in block 1406. However, in an exemplary embodiment, the communication including the beam switch ACK may not be received and/or accurately decoded by the base station 105.

The apparatus 1400 further comprises means 1410 for the base station setting a subframe counter and resending the beam switch command. In certain embodiments, the means 1410 for the base station setting a subframe counter and resending the beam switch command can be configured to perform one or more of the functions described in operation block 1210 of method 1200 (FIG. 12). In an exemplary embodiment, the means 1410 for the base station setting a subframe counter and resending the beam switch command may comprise the base station 105 realizing that the ACK sent by the UE 115 has not been properly received and decoded, setting a subframe counter to a number of subframes, for example, n subframes+14, and resending a communication to the UE 115 over the PDSCH. The communication may include a resending of the beam switch command instructing the UE 115 to switch from the serving beam to the target beam.

The apparatus 1400 further comprises means 1412 for the UE not receiving the resent beam switch command and switching to the target beam. In certain embodiments, the means 1412 for the UE not receiving the resent beam switch command and switching to the target beam can be configured to perform one or more of the functions described in operation block 1212 of method 1200 (FIG. 12). In an exemplary embodiment, the means 1412 for the UE not receiving the resent beam switch command and switching to the target beam may comprise the UE 115, which has already sent the ACK, not being aware of the base station 105 resending the beam switch command and switching to the target beam, while the base station remains on the serving beam.

The apparatus 1400 further comprises means 1414 for remaining on a serving beam and simultaneously transmitting a beam switch command to a UE on the serving beam and on a target beam. In certain embodiments, the means 1414 for remaining on a serving beam and simultaneously transmitting a beam switch command to a UE on the serving beam and on a target beam can be configured to perform one or more of the functions described in operation block 1214 of method 1200 (FIG. 12). In an exemplary embodiment, the means 1414 for remaining on a serving beam and simultaneously transmitting a beam switch command to a UE on the serving beam and on a target beam may comprise the base station 105 continuing to transmit on the serving beam, and simultaneously begin transmitting to the UE 115 on the target beam.

The apparatus 1400 further comprises means 1416 for acknowledging the beam switch command. In certain embodiments, the means 1416 for acknowledging the beam switch command can be configured to perform one or more of the functions described in operation block 1216 of method 1200 (FIG. 12). In an exemplary embodiment, the means 1416 for acknowledging the beam switch command may comprise the UE 115 sending a communication (ACK) to the base station 105 acknowledging the beam switch command on the target beam, and remaining on the target beam, or may comprise the UE 115 sending a communication (ACK) to the base station 105 acknowledging the beam switch command on the serving beam.

The apparatus 1400 further comprises means 1418 for receiving an acknowledgement (ACK) and means for ceasing transmitting on the serving beam. In certain embodiments, the means 1418 for receiving an acknowledgement (ACK) and means for ceasing transmitting on the serving beam can be configured to perform one or more of the functions described in operation block 1218 of method 1200 (FIG. 12). In an exemplary embodiment, the means 1418 for receiving an acknowledgement (ACK) and means for ceasing transmitting on the serving beam may comprise the base station receiving and properly decoding the ACK communication from the UE 115 on the target beam, and then ceasing transmitting on the serving beam, at which time the target beam becomes the then-current serving beam, or may comprise the base station receiving and properly decoding the ACK communication from the UE 115 on the serving beam, and then ceasing transmitting on the serving beam.

Figure 15:
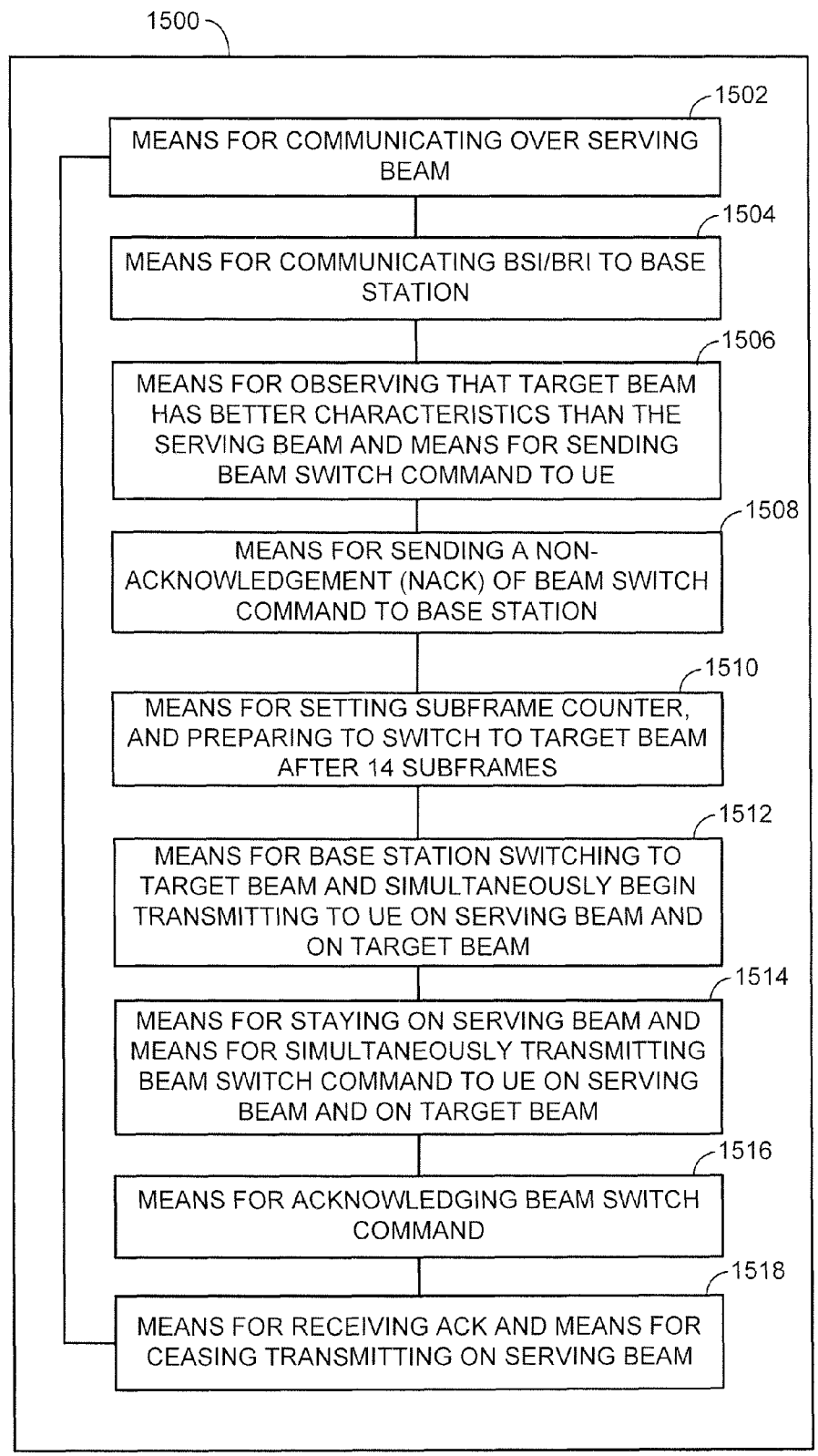
FIG. 15 is a functional block diagram of an apparatus for communication, in accordance with various aspects of the present disclosure.

FIG. 15 is a functional block diagram of an apparatus 1500 for communication, in accordance with various aspects of the present disclosure. The apparatus 1500 comprises means 1502 for communicating over a serving beam. In certain embodiments, the means 1502 for communicating over a serving beam can be configured to perform one or more of the functions described in operation block 1302 of method 1300 (FIG. 13). In an exemplary embodiment, the means 1502 for communicating over a serving beam may comprise the base station 105 communicating with the UE 115 over a serving beam 603.

The apparatus 1500 further comprises means 1504 for communicating information, such as beam information including, for example, beam state information (BSI), beam refinement information (BRI), and beam index (BI) information, collectively referred to herein as beam information. In certain embodiments, the means 1504 for communicating information can be configured to perform one or more of the functions described in operation block 1304 of method 1300 (FIG. 13). In an exemplary embodiment, the means 1504 for communicating information may comprise the UE 115 sending a communication over the PUSCH, to the base station 105. The communication may include, among other information, beam state information (BSI), beam refinement information (BRI), and beam index (BI) information, collectively referred to herein as beam information. In an exemplary embodiment, the beam information may include, from the UEs perspective, the status of the serving beam and a status of one or more target beams that may be available to the UE 115.

The apparatus 1500 further comprises means 1506 for observing that a target beam may have better characteristics than a serving beam and means for sending a beam switch command. In certain embodiments, the means 1506 for observing that a target beam may have better characteristics than a serving beam and means for sending a beam switch command can be configured to perform one or more of the functions described in operation block 1306 of method 1300 (FIG. 13). In an exemplary embodiment, the means 1506 for observing that a target beam may have better characteristics than a serving beam and means for sending a beam switch command may comprise the base station 105 observing that a target beam has better characteristics than the serving beam, and sending a communication to the UE 115 over the PDSCH. The communication may include a beam switch command instructing the UE 115 to switch from the serving beam to the target beam.

The apparatus 1500 further comprises means 1508 for the UE sending a non-acknowledgement (NACK) of beam switch command to the base station. In certain embodiments, the means 1508 for the UE sending a non-acknowledgement (NACK) of beam switch command to the base station can be configured to perform one or more of the functions described in operation block 1308 of method 1300 (FIG. 13). In an exemplary embodiment, the means 1508 for the UE sending a non-acknowledgement (NACK) of beam switch command to the base station may comprise the UE 115 not decoding the beam switch command sent by the base station in block 1506 and sending a communication to the base station 105 non-acknowledging (NACK) the beam switch command sent in block 1506.

The apparatus 1500 further comprises means 1510 for the base station setting a subframe counter and preparing to switch to the target beam after 14 subframes. In certain embodiments, the means 1510 for the base station setting a subframe counter and preparing to switch to the target beam after 14 subframes can be configured to perform one or more of the functions described in operation block 1310 of method 1300 (FIG. 13). In an exemplary embodiment, the means 1510 for the base station setting a subframe counter and preparing to switch to the target beam after 14 subframes may comprise the beam switch NACK sent by the UE in block 1508 not being received and/or accurately decoded by the base station 105. For example, instead of receiving the NACK as intended by the UE 115, the base station 105 may interpret the NACK as an acknowledgement (ACK). The base station 105 believing it has received an ACK from the UE 115 on the beam switch instruction, sets a subframe counter to a number of subframes, for example, n subframes+14, and prepares to switch to the target beam after 14 subframes.

The apparatus 1500 further comprises means 1512 for the base station switching to the target beam and simultaneously transmitting to the UE on the serving beam and on the target beam. In certain embodiments, the means 1512 for the base station switching to the target beam and simultaneously transmitting to the UE on the serving beam and on the target beam can be configured to perform one or more of the functions described in operation block 1312 of method 1300 (FIG. 13). In an exemplary embodiment, the means 1512 for the base station switching to the target beam and simultaneously transmitting to the UE on the serving beam and on the target beam may comprise the base station 105 switching to the target beam, while the UE 115 remains on the serving beam. In accordance with an exemplary embodiment, the base station 105 continues transmitting on the serving beam, and simultaneously begins transmitting to the UE 115 on the target beam.

The apparatus 1500 further comprises means 1514 for remaining on a serving beam and simultaneously transmitting a beam switch command to a UE on the serving beam and on a target beam. In certain embodiments, the means 1514 for remaining on a serving beam and simultaneously transmitting a beam switch command to a UE on the serving beam and on a target beam can be configured to perform one or more of the functions described in operation block 1314 of method 1300 (FIG. 13). In an exemplary embodiment, the means 1514 for remaining on a serving beam and simultaneously transmitting a beam switch command to a UE on the serving beam and on a target beam may comprise the base station 105 continuing to transmit on the serving beam, and simultaneously begin transmitting to the UE 115 on the target beam.

The apparatus 1500 further comprises means 1516 for acknowledging the beam switch command. In certain embodiments, the means 1516 for acknowledging the beam switch command can be configured to perform one or more of the functions described in operation block 1316 of method 1300 (FIG. 13). In an exemplary embodiment, the means 1516 for acknowledging the beam switch command may comprise the UE 115 sending a communication (ACK) to the base station 105 acknowledging the beam switch command on the target beam, and remaining on the target beam, or may comprise the UE 115 sending a communication (ACK) to the base station 105 acknowledging the beam switch command on the serving beam.

The apparatus 1500 further comprises means 1518 for receiving an acknowledgement (ACK) and means for ceasing transmitting on the serving beam. In certain embodiments, the means 1518 for receiving an acknowledgement (ACK) and means for ceasing transmitting on the serving beam can be configured to perform one or more of the functions described in operation block 1318 of method 1300 (FIG. 13). In an exemplary embodiment, the means 1518 for receiving an acknowledgement (ACK) and means for ceasing transmitting on the serving beam may comprise the base station receiving and properly decoding the ACK communication from the UE 115 on the target beam, and then ceasing transmitting on the serving beam, at which time the target beam becomes the then-current serving beam, or may comprise the base station receiving and properly decoding the ACK communication from the UE 115 on the serving beam, and then ceasing transmitting on the serving beam.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples. Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication beam transition in a communication system, comprising:
   exchanging information between a first communication device and a second communication device on a first communication beam;
   receiving beam information from the second communication device on the first communication beam;
   sending from the first communication device a beam switch command on the first communication beam, the beam switch command requesting a transition from the first communication beam to a second communication beam;
   simultaneously sending information from the first communication device to the second communication device on the first communication beam and the second communication beam; and
   ceasing sending information from the first communication device to the second communication device on the first communication beam when transition to the second communication beam is completed by the first communication device and the second communication device.

2. The method of claim 1, wherein simultaneously sending information from the first communication device to the second communication device on the first communication beam and the second communication beam further comprises:
   the first communication device failing to receive a beam switch command acknowledgement from the second communication device;
   the first communication device resending the beam switch command requesting a transition from the first communication beam to the second communication beam;
   the second communication device failing to receive the resent beam switch command;
   the second communication device switching to the second communication beam; and
   the first communication device communicating with the second communication device over the second communication beam.

3. The method of claim 1, wherein simultaneously sending information from the first communication device to the second communication device on the first communication beam and the second communication beam further comprises:
- the second communication device failing to decode the beam switch command;
- the second communication device sending a non-acknowledgement (NACK) communication to the first communication device over the first communication beam;
- the first communication device decoding the NACK as an acknowledgement (ACK);
- the first communication device switching to the second communication beam; and
- the first communication device communicating with the second communication device over the first communication beam.

4. The method of claim 1, wherein the first communication device is a base station and the second communication device is a user equipment.

5. The method of claim 2, further comprising ceasing exchanging information between the first communication device and the second communication device on the first communication beam at the expiration of a predetermined number of communication subframes.

6. The method of claim 3, further comprising continuing exchanging information between the first communication device and the second communication device on the first communication beam at the expiration of a predetermined number of communication subframes.

7. The method of claim 1, wherein simultaneously sending information from the first communication device to the second communication device on the first communication beam and the second communication beam further comprises synthesizing a distorted communication beam having the first communication beam and the second communication beam.

8. An apparatus for communication beam transition in a communication system, comprising:
- a first communication device and a second communication device configured to exchange information on a first communication beam;
- the second communication device configured to send beam information to the first communication device on the first communication beam;
- the first communication device configured to send a beam switch command on the first communication beam, the beam switch command requesting a transition from the first communication beam to a second communication beam;
- the first communication device configured to simultaneously send information to the second communication device on the first communication beam and the second communication beam; and
- the first communication device configured to cease sending information to the second communication device on the first communication beam when transition to the second communication beam is completed by the first communication device and the second communication device.

9. The apparatus of claim 8, further comprising:
- the first communication device failing to receive a beam switch command acknowledgement from the second communication device;
- the first communication device configured to resend the beam switch command requesting a transition from the first communication beam to the second communication beam;
- the second communication device failing to receive the resent beam switch command;
- the second communication device configured to switch to the second communication beam; and
- the first communication device configured to communicate with the second communication device over the second communication beam.

10. The apparatus of claim 8, further comprising:
- the second communication device failing to decode the beam switch command;
- the second communication device configured to send a non-acknowledgement (NACK) communication to the first communication device over the first communication beam;
- the first communication device decoding the NACK as an acknowledgement (ACK);
- the first communication device configured to switch to the second communication beam; and
- the first communication device configured to communicate with the second communication device over the first communication beam.

11. The apparatus of claim 8, wherein the first communication device is a base station and the second communication device is a user equipment.

12. The apparatus of claim 9, further comprising a counter, wherein the first communication device and the second communication device are configured to cease exchanging information on the first communication beam at the expiration of a predetermined number of communication subframes stored in the counter.

13. The apparatus of claim 10, further comprising a counter, wherein the first communication device and the second communication device are configured to continue exchanging information on the first communication beam at the expiration of a predetermined number of communication subframes stored in the counter.

14. The apparatus of claim 8, further comprising a distorted communication beam having the first communication beam and the second communication beam.

15. A device, comprising:
- means for exchanging information between a first communication device and a second communication device on a first communication beam;
- means for receiving beam information from the second communication device on the first communication beam;
- means for sending from the first communication device a beam switch command on the first communication beam, the beam switch command requesting a transition from the first communication beam to a second communication beam;
- means for simultaneously sending information from the first communication device to the second communication device on the first communication beam and the second communication beam; and
- means for ceasing sending information from the first communication device to the second communication device on the first communication beam when transition to the second communication beam is completed by the first communication device and the second communication device.

16. The device of claim 15, wherein the means for simultaneously sending information from the first communication device to the second communication device on the first communication beam and the second communication beam further comprises:

when failing to receive a beam switch command acknowledgement from the second communication device, means for resending the beam switch command requesting a transition from the first communication beam to the second communication beam;

when failing to receive the resent beam switch command, means for switching to the second communication beam; and means for communicating with the second communication device over the second communication beam.

17. The device of claim 15, wherein the means for simultaneously sending information from the first communication device to the second communication device on the first communication beam and the second communication beam further comprises:

when failing to decode the beam switch command, means for sending a non-acknowledgement (NACK) communication to the first communication device over the first communication beam;

when decoding the NACK as an acknowledgement (ACK), means for switching to the second communication beam; and means for communicating with the second communication device over the first communication beam.

18. The device of claim 15, wherein the first communication device is a base station and the second communication device is a user equipment.

19. The device of claim 16, further comprising means for counting a predetermined number of communication subframes, after which the first communication device and the second communication device cease exchanging information on the first communication beam.

20. The device of claim 17, further comprising means for counting a predetermined number of communication subframes, after which the first communication device and the second communication device continue exchanging information on the first communication beam.

21. The device of claim 17, further comprising means for synthesizing a distorted communication beam having the first communication beam and the second communication beam.

22. A non-transitory computer-readable medium storing computer executable code for communication beam transition in a communication system, the code executable by a processor to:

exchange information between a first communication device and a second communication device on a first communication beam;

receive beam information from the second communication device on the first communication beam;

send from the first communication device a beam switch command on the first communication beam, the beam switch command requesting a transition from the first communication beam to a second communication beam;

simultaneously send information from the first communication device to the second communication device on the first communication beam and the second communication beam; and cease sending information from the first communication device to the second communication device on the first communication beam when transition to the second communication beam is completed by the first communication device and the second communication device.

23. The non-transitory computer-readable medium of claim 22, wherein the code is executable by a processor to:

when the first communication device fails to receive a beam switch command acknowledgement from the second communication device, cause the first communication device to resend the beam switch command requesting a transition from the first communication beam to the second communication beam;

when the second communication device fails to receive the resent beam switch command, cause the second communication device to switch to the second communication beam; and cause the first communication device to communicate with the second communication device over the second communication beam.

24. The non-transitory computer-readable medium of claim 22, wherein the code is executable by a processor to:

when the second communication device fails to decode the beam switch command, cause the second communication device to send a non-acknowledgement (NACK) communication to the first communication device over the first communication beam;

when the first communication device decodes the NACK as an acknowledgement (ACK), cause the first communication device to switch to the second communication beam; and cause the first communication device to communicate with the second communication device over the first communication beam.

25. The non-transitory computer-readable medium of claim 22, wherein the first communication device is a base station and the second communication device is a user equipment.

26. The non-transitory computer-readable medium of claim 23, wherein the code is executable by a processor to count a predetermined number of communication subframes, after which the first communication device and the second communication device cease exchanging information on the first communication beam.

27. The non-transitory computer-readable medium of claim 24, wherein the code is executable by a processor to count a predetermined number of communication subframes, after which the first communication device and the second communication device continue exchanging information on the first communication beam.

28. The non-transitory computer-readable medium of claim 22, wherein the code is executable by a processor to synthesize a distorted communication beam having the first communication beam and the second communication beam.

* * * * *